(12) United States Patent
Rossi et al.

(10) Patent No.: US 12,462,169 B2
(45) Date of Patent: Nov. 4, 2025

(54) MACHINE LEARNING TECHNIQUES FOR GENERATING VISUALIZATION RECOMMENDATIONS

(71) Applicant: Adobe Inc., San Jose, CA (US)

(72) Inventors: Ryan Rossi, Santa Clara, CA (US); Xin Qian, Greenbelt, MD (US); Tak Yeon Lee, Cupertino, CA (US); Sungchul Kim, San Jose, CA (US); Sana Lee, Brea, CA (US); Fan Du, Milpitas, CA (US); Eunyee Koh, San Jose, CA (US)

(73) Assignee: ADOBE INC., San Jose, CA (US)

( * ) Notice: Subject to any disclaimer, the term of this patent is extended or adjusted under 35 U.S.C. 154(b) by 1084 days.

(21) Appl. No.: 17/207,959

(22) Filed: Mar. 22, 2021

(65) Prior Publication Data
US 2022/0300836 A1 Sep. 22, 2022

(51) Int. Cl.
*G06N 20/00* (2019.01)
*G06F 18/213* (2023.01)
*G06N 5/04* (2023.01)

(52) U.S. Cl.
CPC .............. *G06N 5/04* (2013.01); *G06F 18/213* (2023.01); *G06N 20/00* (2019.01)

(58) Field of Classification Search
CPC ......... G06N 5/04; G06N 20/00; G06F 18/213
See application file for complete search history.

(56) References Cited

U.S. PATENT DOCUMENTS

| | | | |
|---|---|---|---|
| 6,366,280 B1 * | 4/2002 | Allen ................... | G06T 11/206 714/E11.181 |
| 10,762,422 B2 * | 9/2020 | Shaked ................. | G06N 3/045 |
| 2013/0139080 A1 * | 5/2013 | Thies .................... | G06F 3/048 715/764 |

(Continued)

OTHER PUBLICATIONS

Ehsan et al., MuVE: Efficient Multi-objective View Recommendation for Visual Data Exploration, 2016 IEEE 32nd International Conference on Data Engineering (ICDE), 2016, pp. 731-742.

(Continued)

*Primary Examiner* — Kamran Afshar
*Assistant Examiner* — Steven Phung
(74) *Attorney, Agent, or Firm* — Kilpatrick Townsend & Stockton LLP

(57) ABSTRACT

A visualization recommendation system generates recommendation scores for multiple visualizations that combine data attributes of a dataset with visualization configurations. The visualization recommendation system maps meta-features of the dataset to a meta-feature space and configuration attributes of the visualization configurations to a configuration space. The visualization recommendation system generates meta-feature vectors that describe the mapped meta-features, and generates configuration attribute sets that describe the attributes of the visualization configurations. The visualization recommendation system applies multiple scoring models to the meta-feature vectors and configuration attribute sets, including a wide scoring model and a deep scoring model. In some cases, the visualization recommendation system trains the multiple scoring models using the meta-feature vectors and configuration attribute sets.

20 Claims, 5 Drawing Sheets

(56) References Cited

U.S. PATENT DOCUMENTS

| | | | |
|---|---|---|---|
| 2016/0004759 A1* | 1/2016 | Ramakrishnan | G06F 16/282 715/753 |
| 2019/0122122 A1* | 4/2019 | Rope | G06N 5/01 |
| 2020/0250472 A1* | 8/2020 | Abhyankar | G06F 18/2411 |
| 2021/0157554 A1* | 5/2021 | Minasyan | G06F 16/9577 |
| 2022/0236860 A1* | 7/2022 | Lee | G06F 3/04842 |

OTHER PUBLICATIONS

He et al., Neural Factorization Machines for Sparse Predictive Analytics, In Proceedings of the 40th International ACM SIGIR conference on Research and Development in Information Retrieval, Aug. 7-11, 2017, pp. 355-364.

Hu et al., Dive: A Mixed-initiative System Supporting Integrated Data Exploration Workflows, In Proceedings of the Workshop on Human-In-the-Loop Data Analytics, Jun. 10, 2018, 7 pages.

Hu et al., VizML: A Machine Learning Approach to Visualization Recommendation, In Proceedings of the 2019 CHI Conference on Human Factors in Computing Systems, CHI '19, Association for Computing Machinery, May 4-9, 2019, pp. 1-12.

Lee et al., Avoiding Drill-down Fallacies with VisPilot: Assisted Exploration of Data Subsets, IUI '19: Proceedings of the 24th International Conference on Intelligent User Interfaces, Mar. 17-20, 2019, pp. 186-196.

Lee, Insight Machines: The Past, Present, and Future of Visualization Recommendation, Visualization Research Explained, Feb. 25, 2020, 10 pages.

Mackinlay et al., Automating the Design of Graphical Presentations of Relational Information, ACM Transactions on Graphics, vol. 5, No. 2, Apr. 1986, pp. 110-141.

Mackinlay et al., Show Me: Automatic Presentation for Visual Analysis, IEEE Transactions on Visualization and Computer Graphics, vol. 13, No. 6, 2007, pp. 1137-1144.

Moritz et al., Formalizing Visualization Design Knowledge as Constraints: Actionable and Extensible Models in Draco, IEEE Transactions on Visualization and Computer Graphics, vol. 25, No. 1, Aug. 20, 2018, pp. 438-448.

Perry et al., VizDeck: Streamlining Exploratory Visual Analytics of Scientific Data, iConference 2013 Proceedings, Available Online at: https://faculty.washington.edu/billhowe/publications/pdfs/perry2013vizdeck.pdf, Feb. 12-15, 2013, pp. 338-350.

Roth et al., Interactive Graphic Design Using Automatic Presentation Knowledge, CHI '94: Proceedings of the SIGCHI Conference on Human Factors in Computing Systems, Apr. 1994, pp. 112-117.

Sarawagi et al., Discovery-driven Exploration of OLAP Data Cubes, EDBT '98: Proceedings of the 6th International Conference on Extending Database Technology: Advances in Database Technology, Mar. 1998, pp. 168-182.

Vartak et al., Towards Visualization Recommendation Systems, SIGMOD Record, vol. 45, No. 4, Dec. 2016, pp. 34-39.

Wilkinson et al., Graph-theoretic Scagnostics, In IEEE Symposium on Information Visualization, 2005, pp. 157-164.

Wills et al., AutoVis: Automatic Visualization, Information Visualization, vol. 9, No. 1, Mar. 2010, pp. 47-69.

Wongsuphasawat, Towards a General-purpose Query Language for Visualization Recommendation, HILDA '16: Proceedings of the Workshop on Human-In-the-Loop Data Analytics, No. 4, Jun. 26, 2016, pp. 1-6.

Wongsuphasawat et al., Voyager 2: Augmenting Visual Analysis with Partial View Specifications, CHI '17: Proceedings of the 2017 CHI Conference on Human Factors in Computing Systems, May 2017, pp. 2648-2659.

Wongsuphasawat et al., Voyager: Exploratory Analysis via Faceted Browsing of Visualization Recommendations, IEEE Transactions on Visualization and Computer Graphics, vol. 22, No. 1, 2015, pp. 649-658.

* cited by examiner

MACHINE LEARNING TECHNIQUES FOR GENERATING VISUALIZATION RECOMMENDATIONS

TECHNICAL FIELD

This disclosure relates generally to the field of artificial intelligence, and more specifically relates to machine learning techniques for efficiently modeling and recommending data visualizations.

BACKGROUND

Content creation software frequently utilizes machine-learning techniques to aid users in creating different types of graphical content. For instance, visualization software provides a plethora of editing and presentation functions that are used to create or manipulate visually meaningful depictions of trends or other characteristics in, for example, large datasets that are automatically generated by online computing environments or other systems. Effective application of these content-creation tools in visualization software is heavily dependent on the features of an input dataset from which visualizations are created. As a simplified example, generating a scatterplot visualization from a dataset that includes calendar dates may result in a visualization that is confusing to a viewer. But some datasets used with visualization software may be so large that it is infeasible for a user to objectively or consistently analyze the relevant features of the dataset and select the appropriate tools (e.g., different visualization options) within visualization software. In some cases, a user might inefficiently spend a long amount of time trying to analyze features of a large dataset, while selecting a visualization option.

Visualization recommendation techniques can be used to automate certain features of the visualization content creation process, such as identifying potentially useful visualization tools or configurations that are specific to the features of a dataset. However, contemporary recommendation tools used in visualization software are often manually designed, based on a small quantity of visualization configurations that are described by hand-crafted heuristics. In some cases, such manually designed tools cannot evaluate visualization configurations that are not described by the hand-crafted heuristics, and are unable to provide a recommendation based on a wide variety of visualization configurations. In addition, development of additional heuristics for the manually designed tools can be expensive or time-consuming, requiring extensive effort from a technician to develop and test the additional heuristics. Furthermore, contemporary visualization recommendation tools may become rapidly outdated as data visualization configurations are revised, requiring additional time and effort to update the manually designed tools. Thus, conventional visualization recommendation tools incorporated in visualization software may be insufficient for creating graphical content customized to the features of input dataset.

SUMMARY

According to certain embodiments, a visualization recommendation system generates a recommended visualization of a dataset. An attribute feature-extraction module generates a set of data attribute combinations from data attributes of an input dataset. The attribute feature-extraction module generates a dense meta-feature vector describing a data attribute of the input dataset. The attribute feature-extraction module generates a sparse meta-feature vector identifying a frequency of meta-features in the dense meta-feature vector. The attribute feature-extraction module identifies a set of visualization configurations. Each of the visualization configurations includes a group of configuration attributes that describe visual characteristics of a dataset visualization. The attribute feature-extraction module generates a dense configuration attribute set that identifies the configuration attributes of each visualization configuration in the set of visualization configurations. The attribute feature-extraction module generates a sparse configuration attribute set that identifies a frequency of the configuration attributes in the dense configuration attribute set. A visualization recommendation module identifies a recommended visualization based on a visualization scoring model that is applied to the sparse configuration attribute set and the sparse meta-feature vector. The recommended visualization has a combination of a particular visualization configuration from the set of visualization configurations and a particular meta-feature describing a particular data attribute combination from the dense meta-feature vector. A visualization presentation module generates visualization image data based on the recommended visualization. The visualization presentation module causes a user interface to display the visualization image data.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
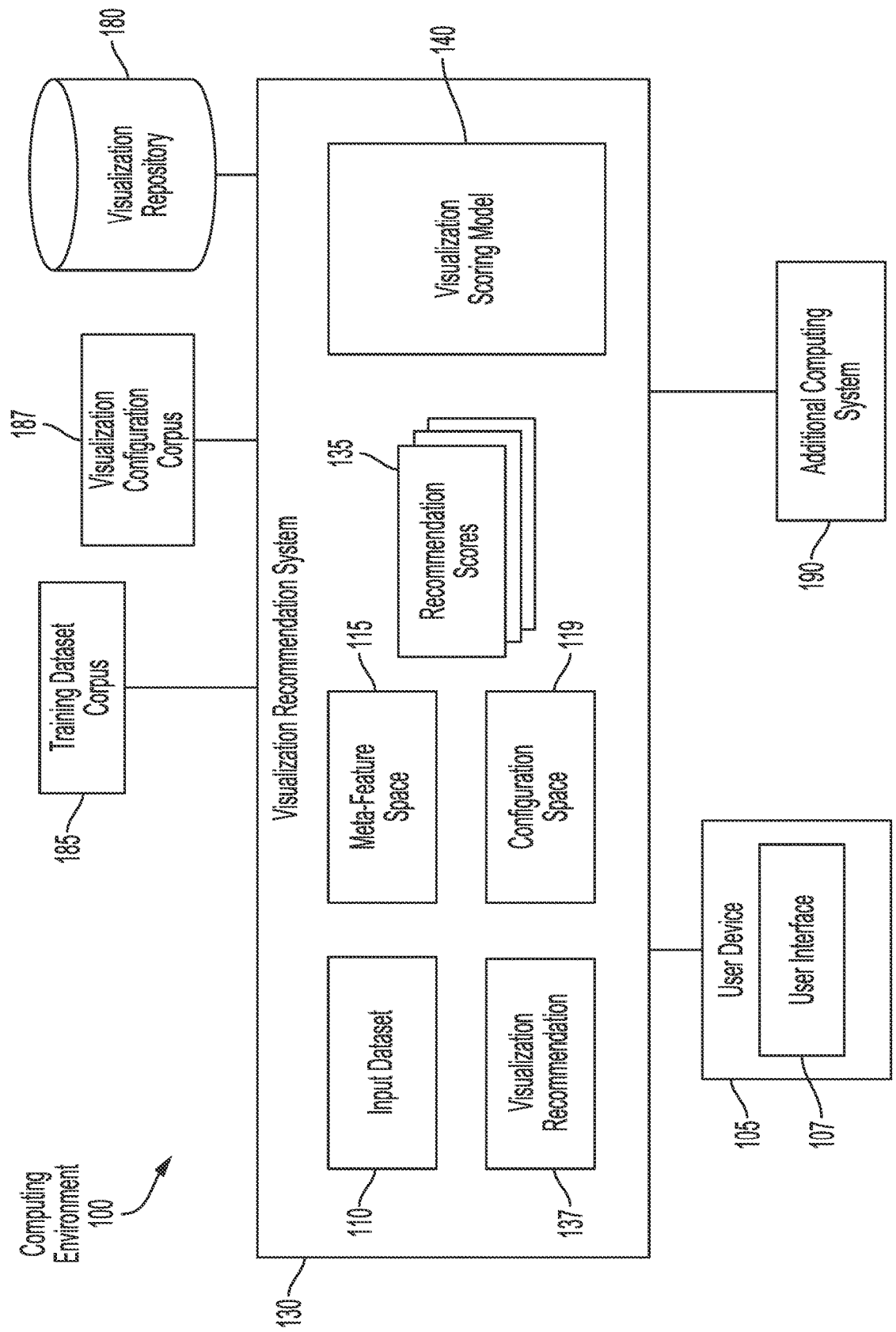
FIG. 1 is a diagram depicting an example of a computing environment that includes a visualization recommendation system configured to generate one or more recommendation scores, according to certain embodiments.

As discussed above, conventional visualization recommendation tools incorporated in visualization software may be insufficient for creating graphical content customized to the features of input dataset. These issues can be addressed by certain embodiments described herein. For example, certain embodiments involve visualization software that generates a recommendation score for a visualization configuration, by analyzing a large-scale real-world corpus to identify meta-features of datasets that are combined with the visualization configuration. Such visualization software generates a meta-feature space in which attributes, such as attributes of the datasets or of the visualization configuration, are mapped as meta-features. The visualization software generates attribute sets that describe the mapped meta-features of the datasets and the visualization configuration. Multiple scoring models are applied to the attribute sets, including a wide scoring model and a deep scoring model. The visualization software applies or trains the multiple scoring models automatically, thereby reducing or eliminating labor-intensive efforts to generate manually defined heuristics for generating graphical content for data visualizations. In some cases, the visualization software generates recommendation scores for multiple visualization configurations that could be combined with an input dataset. The visualization software can provide the multiple recommendation scores via a user interface, such as a group of recommendation scores associated with a menu of candidate visualization configurations. In some cases, automatically generating and providing multiple recommendation scores for various candidate visualization configurations improves understanding or accessibility of the candidate visualization configurations for a user of the visualization software. For example, a user who desires a visualization configuration for a particular dataset can have improved understanding of available candidate visualization configurations, including improved understanding of visualization configurations that were previously unknown, or otherwise inaccessible, to the user. By providing recommendation scores for multiple candidate visualization configurations, the visualization software can allow the user to more accurately evaluate options for visualizing the dataset.

The following examples are provided to introduce certain embodiments of the present disclosure. In this example, a computing system executes visualization software, which is a content-creation tool that generates different types of graphics based on the structure and content of input datasets. The visualization software receives an input dataset and a visualization configuration that is available to visualize the input dataset. The visualization software identifies data attributes of the input dataset. For example, the data attributes could describe characteristics of the dataset, such as a quantity of included data records, datatypes included in the records, a range of values included in the dataset, or other characteristics of the input dataset. The example visualization software generates a feature space in which the data attributes of the input dataset are mapped as meta-features. For example, the meta-features within the feature space could indicate relationships between meta-features of the input dataset and additional meta-features of additional datasets, such as training datasets. Additionally or alternatively, the visualization software identifies configuration attributes of the visualization configuration. For example, the configuration attributes could describe characteristics of the visualization configuration, such as a visualization type (e.g., scatterplot, bar chart), binning ranges for data values, or other characteristics of the visualization configuration. In this example, the visualization software generates multiple data attribute sets based on the meta-features of the input dataset, and multiple configuration attribute sets based on the configuration attributes.

Continuing with this example, the visualization software provides the data attribute sets and the configuration attribute sets to a visualization scoring model that is included in the visualization software. The visualization scoring model includes a wide model and a deep model that can generate scores for a combination of the input dataset and the visualization configuration. The wide model is capable of generating a wide score, indicating a similarity of the combined input dataset and visualization configuration with a large quantity of training data visualizations. The deep model is capable of generating a deep score, indicating a similarity of the combined input dataset and visualization configuration with a small quantity of training data visualizations. The visualization scoring model generates a recommendation score for the visualization configuration with respect to the input dataset. For instance, the recommendation score indicates an effectiveness of the visualization configuration for the input dataset, such as how effectively information from the input dataset is presented by the visualization configuration. In this example, the visualization software provides the recommendation score for the visualization configuration via a user interface. For example, the visualization software could present, via the user interface, multiple recommendation scores for multiple visualization configurations that are candidates for the input dataset. Additionally or alternatively, the visualization software could present, via the user interface, visualization image data that presents the data from the input dataset using the scored visualization configurations. A user of the visualization software could receive the recommendation scores and visualization image data via the user interface. In some cases, the recommendation scores or the visualization image data could improve understanding of the input dataset by the example user.

Certain embodiments described herein provide improvements to content-creation software that automatically generates graphical content, such as a visualization, that is defined by and illustrates features of input datasets. For example, visualization software described herein generates meta-features from a dataset (e.g., training dataset, input dataset) by applying particular rules, such feature extraction functions, to an input dataset. Additionally or alternatively, visualization software described uses machine-learning techniques that facilitate the creation of graphical content utilizing these meta-features, such as configuring or applying a wide model or a deep model that generates recommendation score usable for selecting different visualization tools (e.g., recommended visualizations) that are specific to the input dataset. In some cases, the application of these rules achieves an improved technological result, such as more effectively automating creation of visualization content as compared to existing software tools, which rely on subjective judgements from users or manually designed recommendation tools that fail to effectively translate the features of a dataset to desirable visualization graphics. Thus, embodiments described herein improve the utility of content creation tools that utilize machine-learning techniques for automating tasks previously performed by humans.

Referring now to the drawings, FIG. 1 is an example of a computing environment 100 that includes a visualization recommendation system 130. The visualization recommendation system 130 includes processing hardware that executes visualization software and is thereby configured to generate one or more recommendation scores, such as recommendation scores 135, for one or more visualization configurations. The recommendation scores for the visualization configurations are generated, for example, with respect to one or more datasets, such as an input dataset 110. Additionally or alternatively, the visualization recommendation system 130 generates a visualization recommendation 137 that indicates a visualization configuration recommended for the input dataset 110. The computing environment 100 includes one or more of the visualization recommendation system 130, a user device 105, an additional computing system 190, or a visualization repository 180. In some cases, the visualization repository 180 includes data that is accessible by the visualization recommendation system 130, such as a training dataset corpus 185 or a visualization configuration corpus 187. Additionally or alternatively, the user device 105 includes a user interface 107 by which a user of the user device 105 may provide or receive data in the computing environment 100.

In some implementations, the visualization recommendation system 130 receives the input dataset 110, or data indicating the input dataset 110. In some cases, the input dataset 110 is an unseen dataset, such as a dataset that is not included in the training dataset corpus 185. Additionally or alternatively, the visualization recommendation system 130 receives data indicating a request for a recommended visualization of the input dataset 110. In some cases, the input dataset 110 and the request for the recommended visualization are received from a computing device, such as the user device 105. For example, a user of the user device 105 could provide, via the user interface 107, a request that indicates a storage location of the input dataset 110, such as on the additional computing system 190. In some cases, the visualization recommendation system 130 could identify a recommended visualization responsive to receiving the input dataset 110, e.g., without receiving a request for a recommended visualization.

In FIG. 1, the visualization recommendation system 130 identifies one or more data attributes of the input dataset 110. The data attributes describe, for example, characteristics of the input dataset 110, such as a quantity of data records in the input dataset 110, datatypes (e.g., string, numeric, Boolean) included in the records, a range of data values, or other characteristics of the input dataset 110. Additionally or alternatively, the visualization recommendation system 130 extracts meta-features that represent the data attributes of the input dataset 110. In some cases, the visualization recommendation system 130 generates or modifies one or more data structures, such as a meta-feature space 115, configured to represent the extracted meta-features. The meta-feature space 115 includes, for example, data representing meta-features of multiple datasets, such as training datasets received from the training dataset corpus 185. In FIG. 1, the meta-feature space 115 can be modified to include meta-features of the input dataset 110. Additionally or alternatively, the meta-feature space 115 includes data that represents relationships among the meta-features of the input dataset 110 and the training datasets. For example, the meta-feature space 115 can include vector data by which similarities among the meta-features of the input dataset 110 and the training datasets can be determined. In some cases, training (or retraining) a visualization software based on a large training corpus or a training corpus that is updated improves accuracy or relevance of recommendation scores generated by the trained visualization software. For example, a visualization software that is retrained on an updating training corpus can generate recommendation scores that are more relevant to a user of the training examples included in the updated corpus.

In some implementations, the visualization recommendation system 130 extracts features that represent configuration attributes of the visualization configuration corpus 187. In some cases, the visualization recommendation system 130 generates or modifies one or more data structures, such as a configuration space 119, configured to represent the configuration attributes of visualization configurations from the corpus 187. For convenience, and not by way of limitation, a configuration space is described herein as having mapped configuration attributes of one or more visualization configurations, and a meta-feature space is described herein as having mapped meta-features of one or more datasets. In FIG. 1, the configuration space 119 includes data that represents relationships among the configuration attributes of the visualization configuration corpus 187, such as vector data by which similarities among the configuration attributes can be determined.

In some cases, a visualization recommendation system that uses one or more of a meta-feature space or a configuration space can provide a technically improved visualization recommendation, as compared to a contemporary visualization recommendation tool. For instance, visualization software that lacks the features described herein may be unable to learn or evaluate additional visualization configurations. In one example, existing visualization recommendation systems that lack certain features depicted in FIG. 1 generate a recommendation for a visualization configuration by applying manually defined heuristics established by a technician (e.g., a computer programmer or graphical designer), which may be insufficient for evaluating different visualization configurations that are not described by the manually defined heuristics.

In contrast with such existing techniques, the visualization recommendation system 130 can rapidly score multiple visualization configurations based on relationships among meta-features that are represented in the meta-feature space 115 or configuration attributes that are represented in the configuration space 119. Additionally or alternatively, the visualization recommendation system 130 accurately generates the visualization recommendation 137 that identifies a visualization configuration suitable for the input dataset 110 (e.g., visualizes the dataset accurately and clearly). In FIG. 1, each of the meta-feature space 115 and the configuration space 119 provides an improved data structure that implements a technical advantage for techniques to generate the recommendation scores 135 for one or more visualization configurations.

In FIG. 1, the visualization recommendation system 130 determines the recommendation scores 135 for one or more candidate visualization configurations that could be applied to the input dataset 110. For example, the visualization recommendation system 130 calculates the recommendation scores 135 for multiple visualization configurations from the visualization configuration corpus 187. A particular visualization configuration indicates, for example, characteristics of a visualization by which data can be presented. Characteristics of a visualization configuration can include, for example, a visualization type (e.g., scatterplot, bar chart, Venn diagram), binning ranges for data values, an orientation (e.g., horizontal axes, vertical axes), colors applied to data points, or other characteristics of the visualization configuration. In FIG. 1, the visualization configuration corpus 187 is described with respect to visual characteristics, but other visualization characteristics are possible, such as characteristics for audio or haptic presentation of data. In some cases, the visualization configuration corpus 187 includes a large quantity (e.g., thousands, tens of thousands) of visualization configurations that are available to be applied to the input dataset 110. Additionally or alternatively, the visualization recommendation system 130 determines the recommendation scores 135 for some or all of the visualization configurations included in the visualization configuration corpus 187. In some cases, the visualization recommendation system 130 uses one or more of specialized rules or specialized data structures to efficiently and accurately generate the recommendation scores 135 for a large quantity of visualization configurations.

In some implementations, the visualization recommendation system 130 generates one or more data attribute sets that describe data attributes of the input dataset 110. Additionally or alternatively, the visualization recommendation system 130 generates one or more data attribute sets that describe data attributes of training datasets from the training dataset corpus 185, such as during a training phase for the visualization recommendation system 130. In some cases, the data attribute sets are generated based on the meta-feature space 115. For example, the visualization recommendation system 130 identifies data attributes for inclusion in the data attribute sets by identifying relationships among positions of meta-features represented within in the meta-feature space 115, such as clusters of meta-features. Additionally or alternatively, the visualization recommendation system 130 generates one or more configuration attribute sets that describe configuration attributes of respective visualization configurations from the visualization configuration corpus 187. In some cases, a large quantity of data attribute sets or configuration attribute sets are generated by the visualization recommendation system 130, such as multiple configuration attribute sets for each visualization configuration included in the visualization configuration corpus 187 and each training dataset included in the training dataset corpus 185.

In FIG. 1, the visualization recommendation system 130 provides the data attribute sets and the configuration attribute sets to one or more scoring models, such as the visualization scoring model 140. The visualization scoring model 140 is configured to generate a recommendation score, e.g., included in the recommendation scores 135, for each candidate visualization configuration for the input dataset 110. In some cases, the visualization scoring model 140 generates a respective recommendation score for each visualization configuration included in the visualization configuration corpus 187. In some cases, the visualization scoring model 140 includes one or more specialized rules by which a recommendation score can be generated, such as rules described by objective functions, transformation functions, parameters, or other additional model components that can describe a rule for scoring. In some cases, a visualization recommendation system that includes a visualization scoring model implementing one or more specialized rules can more efficiently provide recommendation scores for a group of multiple visualization configurations. For example, the visualization recommendation system 130 can apply the trained visualization scoring model 140 to rapidly score a large quantity of candidate visualization configurations for the input dataset 110. Additionally or alternatively, the visualization scoring model 140 can be efficiently retrained based on additional training examples (e.g., additional training datasets), enabling improved accuracy of the recommendation scores 135 that are generated by the visualization recommendation system 130.

In some cases, a visualization recommendation system that uses a visualization scoring model can provide a more understandable visualization recommendation, as compared to a contemporary visualization recommendation system. For instance, visualization software that lacks the features described herein may be unable to learn or evaluate additional visualization configurations. In one example, existing visualization recommendation systems that lack certain features depicted in FIG. 1 may fail to account for variations in users of a data visualization. For instance, a particular visualization configuration may be very well understood by an academic audience (e.g., a scientific journal) but very poorly understood by a journalistic audience (e.g., a newspaper). In this example, relying solely on manually defined heuristics may generate an identical recommendation for the particular visualization configuration without considering a user audience, resulting in poor user understanding for one or both of the example audiences.

In FIG. 1, the visualization recommendation system 130 identifies one or more recommended visualization configurations based on the recommendation scores 135. For example, the visualization recommendation system 130 identifies a maximum value (or a value that meets another suitable criteria) among the recommendation scores 135. Additionally or alternatively, the recommendation scores 135 are compared to a recommendation threshold. The visualization recommendation system 130 generates the visualization recommendation 137 from the identified value or compared values of the recommendation scores 135. In some cases, the visualization recommendation 137 includes data describing the associated recommended visualization configuration, such as data describing a scatterplot type or a set of data binning ranges. Additionally or alternatively, the visualization recommendation 137 includes a combination of the recommended visualization configuration applied to the input dataset 110, such as visualization image data that presents values from the input dataset 110 according to the recommended configuration.

In FIG. 1, the visualization recommendation system 130 provides the visualization recommendation 137 to the user device 105. In some cases, multiple visualization recommendations, such as for visualization configurations with respective recommendation scores that exceed the recommendation threshold, are provided to the user device 105. In some cases, the multiple visualization recommendations are presented via the user interface 107. Additionally or alternatively, the multiple visualization recommendations are combined with the input dataset 110, depicting how the dataset 110 looks (or is otherwise presented) with each of the multiple visualization recommendations. In some cases, multiple data visualizations are presented via the user interface 107, such as a menu of recommended visualization configurations for the input dataset 110. A person using the user device 105 can select (e.g., via an input to the user interface 107) one or more of the presented visualization recommendations. In some cases, a user interface that presents a menu of recommended visualization configurations enables improved comprehension of the dataset by a user. For instance, the example person using the user device 105 could more readily understand the data values included in the input dataset 110 when the dataset 110 is presented with the multiple recommended visualizations. Additionally or alternatively, the user interface that presents a menu of recommended visualization configurations provides an improved user interface by which a user can rapidly select a visualization configuration, thus reducing time-consuming manual effort to individually map a dataset to various visualization configurations that are known to the user.

In some cases, the visualization recommendation system 130 is included in, or otherwise capable of communicating with, a data publication computing system, such as a webserver, a digital repository of academic data, or any other computing system suitable for publishing data. For example, a person who wishes to access or provide information via the data publication computing system requests, via the user interface 107 and from the visualization recommendation system 130, a data visualization for the input dataset 110. Responsive to receiving the request, the visualization recommendation system 130 determines the visualization recommendation 137. In some cases, one or more of the input dataset 110 or the visualization recommendation 137 is provided to the additional computing system 190. For example, responsive to a request via the user interface 107 to publish the input dataset 110, the visualization recommendation system 130 generates a combination of the input dataset 110 and the recommended visualization configuration indicated by the visualization recommendation 137. The combination of the input dataset 110 and the recommended visualization configuration is provided, for example, to the additional computing system 190, such as for digital publication or other types of access by users of the additional computing system 190. In some cases, providing the combination of the input dataset 110 and the recommended visualization configuration enables improved access to or comprehension of the information represented by the input dataset 110, such as improved comprehension by users of the additional computing system 190 or the user device 105.

Figure 2:
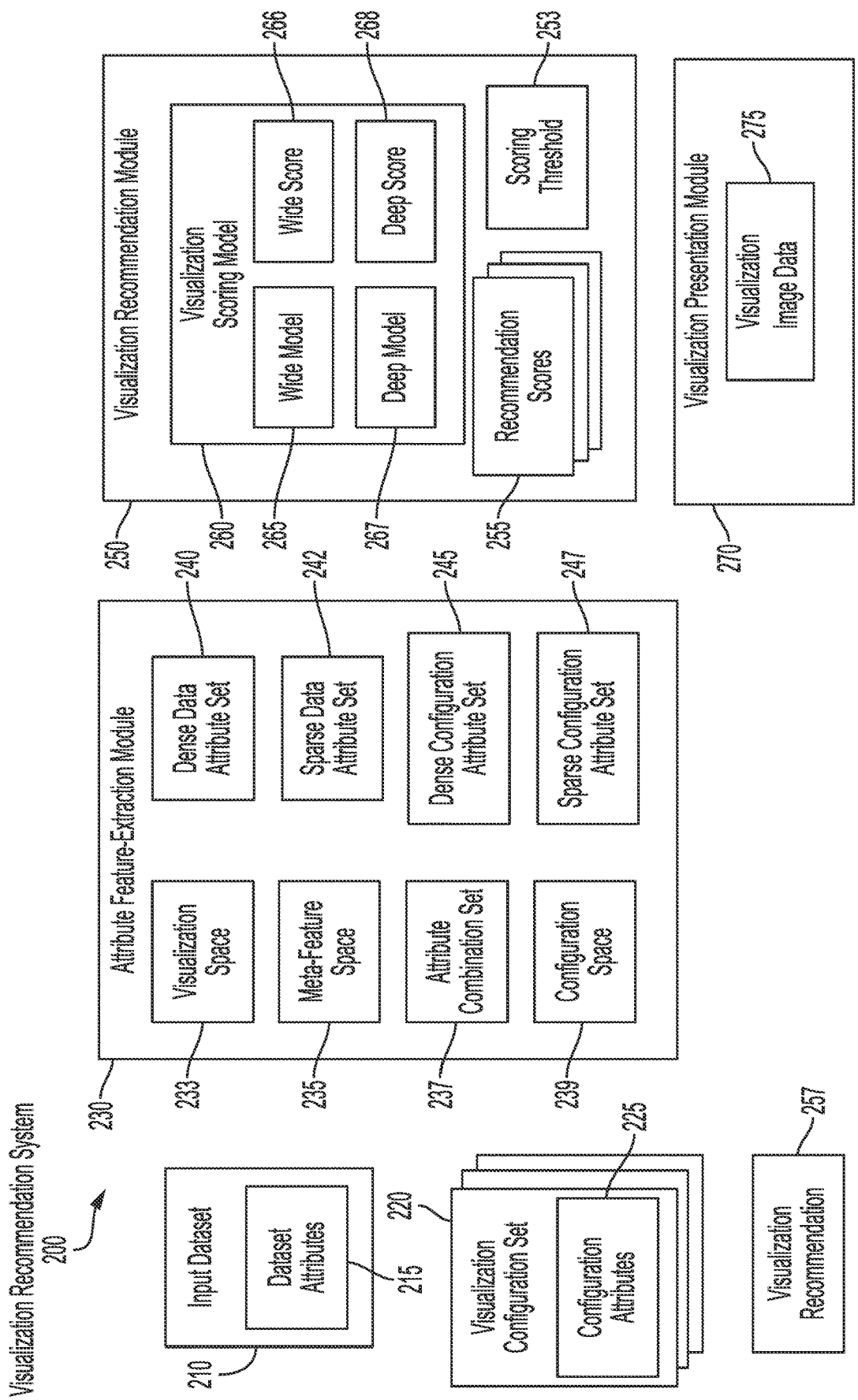
FIG. 2 is a diagram depicting an example of a visualization recommendation system configured to determine recommendation scores for visualization configurations with respect to a dataset, according to certain embodiments.

In some implementations, a visualization recommendation system includes an attribute feature-extraction module configured for identifying data attributes of a dataset, identifying configuration attributes of a visualization configuration, extracting meta-features that describe data attributes of the dataset, or generating sets of attributes based on the data attributes, configuration attributes, or meta-features. In some implementations, the example visualization recommendation system includes a visualization scoring model that is configured to calculate recommendation scores for visualization configurations based on one or more sets of attributes received from the attribute feature-extraction module. FIG. 2 depicts an example of a visualization recommendation system 200 that is configured to determine recommendation scores for visualization configurations, with respect to a dataset. The visualization recommendation system 200 includes one or more of an attribute feature-extraction module 230, a visualization recommendation module 250, or a visualization presentation module 270. In some implementations, the visualization recommendation system 200 receives one or more of an input dataset 210 or a visualization configuration set 220. For example, the input dataset 210 or the visualization configuration set 220 are received from one or more of a user device, a repository of visualization data, or an additional computing system, such as described in regards to FIG. 1. Additionally or alternatively, the visualization recommendation system 200 is configured to generate one or more recommendations for visualization configurations, such as a visualization recommendation 257. In some cases, the visualization recommendation 257 includes a recommendation score for a particular visualization configuration of the set 220, with respect to the input dataset 210.

In some implementations, one or more modules of the visualization recommendation system 200 generate specialized data structures or apply scoring techniques to the specialized data structures. Calculation of one or more recommendation scores is based, for instance, on the specialized data structures or the applied scoring techniques. For example, the attribute feature-extraction module 230 generates one or more meta-feature vectors from data attributes of the input dataset 210, such as a dense data attribute set 240 and a sparse data attribute set 242. Additionally or alternatively, the attribute feature-extraction module 230 generates one or more configuration attribute sets from configuration attributes of the visualization configuration set 220, such as a dense configuration attribute set 245 and a sparse configuration attribute set 247. In some cases, one or more of the data attribute sets 240 or 242 include vector data describing meta-features of the dataset attributes 215. Additionally or alternatively, one or more of the configuration attribute sets 245 or 247 include vector data describing features of the configuration attributes 225. The visualization recommendation module 250 receives, for example, the data attribute sets and the configuration attribute sets generated by the attribute feature-extraction module 230. A visualization scoring model 260 included in the visualization recommendation module 250 generates one or more recommendation scores, such as recommendation scores 255, by identifying attributes that are represented by the data attribute sets and the configuration attribute sets. Based on the recommendation scores 255, the visualization recommendation module 250 determines one or more recommended visualization configurations from the set 220. In some cases, a visualization presentation module 270 generates one or more data structures that include visualization image data, such as visualization image data 275, by combining data values from the input dataset 210 with a recommended visualization configuration. Additionally or alternatively, the visualization image data 275 is included in the visualization recommendation 257.

In FIG. 2, the attribute feature-extraction module 230 generates the data attribute sets and configuration attribute sets based on attributes of the input dataset 210 or the visualization configuration set 220. The attribute feature-extraction module 230 is configured, for example, to identify dataset attributes 215 of the input dataset 210 and configuration attributes 225 of the visualization configurations in the set 220. The dataset attributes 215 describe, for example, characteristics of the input dataset 210. For each particular visualization configuration in the visualization configuration set 220, the configuration attributes 225 describe, for example, characteristics of the particular visualization configuration. In some cases, the attribute feature-extraction module 230 is configured to extract meta-features describing the dataset attributes 215. In some implementations, the attribute feature-extraction module 230 generates or modifies a meta-feature space 235, such that the extracted meta-features for the input dataset 210 are mapped within the meta-feature space 235. In some cases, the meta-feature space 235 includes additional meta-features of additional datasets. For example, meta-features of training datasets (e.g., from the training dataset corpus 185) are mapped within the meta-feature space 235. In some cases, the meta-feature space 235 includes vector data representing the mapped meta-features. Relationships among meta-features of multiple datasets, such as the input dataset 210 or additional training datasets, can be determined by identifying relationships among the vector data of the meta-feature space. For example, a similarity between particular meta-features could be identified by determining that vector data for the particular meta-features have similar values, or values that are within a cluster.

Additionally or alternatively, the attribute feature-extraction module 230 generates or modifies a configuration space 239, such that configuration attributes 225 from the set 220, such that features describing the configuration attributes 225 for each of the visualization configurations in the set 220 are mapped within the configuration space 239. In some cases, the configuration space 239 includes vector data representing the mapped configuration attributes. Relationships among configuration attributes of multiple visualization configurations, such as the visualization configuration set 220, can be determined by identifying relationships among the vector data of the configuration space.

In some implementations, the attribute feature-extraction module 230 generates or modifies a visualization space 233 based on a combination of the meta-feature space 235 and the configuration space 239. For example, the visualization space 233 could include vector data describing combinations of meta-features with configuration attributes that are respectively mapped to the spaces 235 and 239. In some cases, the visualization space 233 indicates relationships among all possible data visualizations of the input dataset 210, given the visualization configuration set 220. Additionally or alternatively, the visualization space 233 indicates all possible data visualizations of multiple training datasets, such as training datasets from the training dataset corpus 185, given the visualization configuration set 220. In some cases, the visualization space 233 indicates whether or not a particular visualization configuration from the set 220 is applied to a particular training dataset. For example, if a user selected the particular visualization configuration to present the particular training dataset, the visualization space 233 could indicate that the combination of the particular visualization configuration and the particular training dataset is a selected data visualization (e.g., a configuration that is selected to present the particular training dataset). In some cases, one or more modules of the visualization recommendation system 200 are trained using the visualization space 233. For example, the visualization scoring model 260 (or one or more sub-models) could be trained using combinations of particular visualization configurations in particular training datasets that are indicated as selected data visualizations.

In some implementations, the attribute feature-extraction module 230 generates an attribute combination set 237 from the dataset attributes 215. The attribute combination set 237 includes, for example, multiple combinations of the dataset attributes 215. Each combination in the attribute combination set 237 includes at least one attribute from the dataset attributes 215. In some cases, a visualization recommendation system that generates (or receives) a set of attribute combinations for a particular input dataset generates more accurate recommendations scores for visualization configurations with respect to the particular input dataset. For instance, the visualization recommendation system 200 could generate a recommendation score based on a combination of the dataset attributes 215 that are more relevant to visualization of the input dataset 210. As an example, if the input dataset 210 describes tuition costs for a group of students, the dataset attributes 215 could include a first attribute describing a range of tuition costs and a second attribute describing an average number of characters in student names. In this example, a first recommendation score calculated using the first attribute and a second recommendation score calculated using the second attribute could indicate that visualizations depicting the range of tuition costs are more relevant (e.g., have a higher recommendation score), as compared to visualizations depicting the average number of characters in the student names.

In FIG. 2, the attribute feature-extraction module 230 generates the data attribute sets 240 and 242 based on one or more of the dataset attributes 215, meta-features described within the meta-feature space 235, or the attribute combination set 237. For example, the attribute feature-extraction module 230 identifies, for each particular attribute combination included in the set 237, meta-features that describe the dataset attributes that are included in the particular attribute combination. Additionally or alternatively, the attribute feature-extraction module 230 generates or modifies the dense data attribute set 240 to include the meta-features for the particular attribute combination. In some cases, the dense data attribute set 240 includes respective groups of meta-features for each respective attribute combination included in the attribute combination set 237. For example, the dense data attribute set 240 includes a first group of meta-features describing attributes included in a first attribute combination, concatenated with a second group of meta-features describing attributes included in a second attribute combination, concatenated with additional groups of meta-features for each additional attribute combination of the set 237. In some cases, a visualization recommendation system that generates or receives a dense data attribute set can calculate recommendation scores by identifying similarities among a large number of meta-features associated with a small number of datasets. For example, if the input dataset 210 has a large number of meta-features that are similar to meta-features of a small number of training datasets, the visualization recommendation system 200 could generate a recommendation score with improved accuracy by identifying similarities (or other relationships) among the meta-features represented in the dense data attribute set 240.

In some implementations, the attribute feature-extraction module 230 identifies a frequency of meta-features across multiple attribute combinations of the attribute combination set 237. Additionally or alternatively, the attribute feature-extraction module 230 generates or modifies the sparse data attribute set 242 to identify a frequency of a particular meta-feature within the attribute combinations of the set 237. For example, for each particular attribute combination in the set 237, the sparse data attribute set 242 includes a value (e.g., a numeric value, a Boolean value) indicating whether a particular meta-feature is associated with the particular attribute combination. In some cases, a visualization recommendation system that generates or receives a sparse data attribute set can calculate recommendation scores by identifying similarities among a small number of meta-features associated with a large number of datasets. For example, if the input dataset 210 has a small number of meta-features that are similar to meta-features of a large number of training datasets, the visualization recommendation system 200 could generate a recommendation score with improved accuracy by identifying similarities (or other relationships) the meta-features represented in the sparse data attribute set 242.

In some implementations, one or more of the dataset attributes 215, meta-features in the meta-feature space 235, the attribute combination set 237, or the data attribute sets 240 and 242 are independent of data values that are included in the input dataset 210. For example, the dataset attributes 215 can describe characteristics of the input dataset 210 without describing the values (e.g., alphanumeric values) that are included in the input dataset 210. Using the above example of tuition costs for a group of students, data values of the input dataset 210 could describe names of students and monetary values indicating the example tuition costs. In this example, the dataset attributes 215 of the input dataset 210 could describe a quantity of records with student names, a numeric range or normalized numeric range of the tuition costs, or other characteristics about the input dataset 210, without including values that describe the student names or tuition costs. In this example, the dataset attributes 215, meta-features in the meta-feature space 235, the attribute combination set 237, and the data attribute sets 240 and 242 describe or are derived from characteristics about the input dataset 210 and are independent of the student name values or monetary values included in the input dataset 210. For instance, a first dataset attribute that describes a quantity of records with student names is independent of the names that are included in the records. Additionally or alternatively, a second dataset attribute that describes a normalized range of the tuition costs is independent of the monetary values included within the range.

In FIG. 2, the attribute feature-extraction module 230 generates the configuration attribute sets 245 and 247 by identifying relationships among the configuration attributes 225 within the configuration space 239. For example, the attribute feature-extraction module 230 identifies, for each configuration visualization included in the visualization configuration set 220, configuration attributes that are mapped as features within the configuration space 239. Additionally or alternatively, the attribute feature-extraction module 230 generates or modifies the dense configuration attribute set 245 to include or otherwise indicate the configuration attributes mapped within the configuration space 239. In some cases, the dense configuration attribute set 245 includes, for each visualization configuration in the set 220, a value, such as a one-hot value, indicating a mapped feature for a particular configuration attribute that is included in the visualization configuration. In some cases, a visualization recommendation system that generates or receives a dense configuration attribute set can calculate a recommendation score for a particular visualization configuration by identifying frequently occurring relationships among configuration attributes mapped within a configuration space.

In some implementations, the attribute feature-extraction module 230 identifies a frequency of configuration attributes that are mapped to the configuration space 239. Additionally or alternatively, the attribute feature-extraction module 230 generates or modifies the sparse configuration attribute set 247 to identify a frequency of a particular configuration attribute within the visualization configurations of the set 220. For example, for each particular visualization configuration in the set 220, the sparse configuration attribute set 247 includes a value indicating whether the particular visualization configuration includes a particular configuration attribute. Additionally or alternatively, for each particular visualization configuration in the set 220, the sparse configuration attribute set 247 includes a value indicating how frequently a training dataset (e.g., from the training dataset corpus 185) is visualized via a visualization configuration having a configuration attribute similar to the particular visualization configuration. In some cases, a visualization recommendation system that generates or receives a sparse configuration attribute set can calculate a recommendation score for a particular visualization configuration by determining how frequently configuration attributes of the particular visualization configuration are used by additional visualization configurations, or by additional visualization configurations that are applied to training datasets.

In FIG. 2, the visualization recommendation module 250 receives one or more of the dense data attribute set 240, the sparse data attribute set 242, the dense configuration attribute set 245, or the sparse configuration attribute set 247. In some cases, the visualization recommendation module 250 includes one or more scoring models, such as the visualization scoring model 260, that are configured to determine the recommendation scores 255 based on the received attribute sets 240, 242, 245, and 247, such as by identifying frequently occurring relationships among vector data that represent the attributes. In FIG. 2, the visualization scoring model 260 includes multiple sub-models, including a wide model 265 and a deep model 267. The visualization scoring model 260, or the multiple sub-models, can be configured to generate a respective recommendation score for a particular visualization configuration from the visualization configuration set 220. For example, for each particular visualization configuration included in the set 220, the wide model 265 is configured to generate a respective wide score 266 and the deep model 267 is configured to generate a respective deep score 268. Additionally or alternatively, the visualization scoring model 260 determines the recommendation scores 255 using a combination of outputs from the wide model 265 and the deep model 267, such as by calculating a particular recommendation score from a weighted sum of the respective wide score 266 and the respective deep score 268. In some cases, one or more of the recommendation scores 255, the wide score 266, or the deep score 268 are calculated with respect to the input dataset 210. For example, the respective recommendation score for the particular visualization configuration indicates whether the particular visualization configuration is suitable (e.g., improves comprehension for a viewer) for the input dataset 210.

In some implementations, each of the wide model 265 and the deep model 267 generate a respective score based upon combinations of one or more of the attribute sets 240, 242, 245, or 247. In some cases, the wide model 265 and the deep model 267 are trained, such as during a training phase of the visualization recommendation system 200, from combinations of visualization configurations that are applied to training datasets (e.g., the visualization configuration corpus 187 applied to the training dataset corpus 185). Each of the wide model 265 and the deep model 267 include, for example, one or more parameters that are modified during the training phase, such that applying the parameters of the trained models 265 and 267 generates a recommendation score for a visualization configuration applied to an input dataset.

In FIG. 2, the wide model 265 receives the sparse data attribute set 242 and the sparse configuration attribute set 247. Additionally or alternatively, the wide model 265 identifies feature-pairs that occur frequently across the sparse data attribute set 242 and the sparse configuration attribute set 247. For instance, the wide model 265 can be trained to identify feature-pairs of configuration attributes and data attributes that co-occur in multiple visualizations that combine data attribute combinations and visualization configurations. In some cases, the wide model 265 generates a recommendation score indicating that a combination of the dataset attributes 215 and the configuration attributes 225 for a particular visualization configuration includes co-occurring feature-pairs (e.g., determined from the sparse data attribute set 242 and the sparse configuration attribute set 247) that are commonly found in a training corpus of visualization configurations applied to training datasets. In some cases, the wide model 265 is trained to identify the co-occurrence of feature-pairs within a large set of dataset attribute/configuration attribute combinations, such as within a relatively large training corpus of visualization configurations that are applied to a relatively large number of training datasets.

Additionally or alternatively, the deep model 267 receives the dense data attribute set 240 and the dense configuration attribute set 245. In some cases, the deep model 267 identifies feature-pairs that occur for a small number of training visualizations (e.g., visualization configurations applied to training datasets) represented by the dense data attribute set 240 and the dense configuration attribute set 245. For example, the deep model 267 can be trained to identify feature-pairs of configuration attributes and data attributes within a relatively small number of training datasets that have a particular visualization configuration applied with a relatively high frequency. In some cases, the deep model 267 generates a recommendation score indicating that a combination of the dataset attributes 215 and the configuration attributes 225 for the particular visualization configuration includes feature-pairs (e.g., determined from the dense data attribute set 240 and the dense configuration attribute set 245) that are commonly found in a particular visualization configuration applied to a particular training dataset (or small group of training datasets) in a training corpus of visualization configurations applied to training datasets.

In FIG. 2, the visualization recommendation system 200 identifies one or more recommended visualization configurations that are associated with respective scores of the recommendation scores 255. In some cases, the visualization recommendation module 250 identifies a recommended visualization configuration by applying a scoring threshold 253 to one or more of the recommendation scores 255. Responsive to determining that a particular recommendation score exceeds (or otherwise fulfills) the scoring threshold 253, the visualization recommendation module 250 identifies the particular visualization configuration associated with the particular recommendation score as a recommended visualization configuration. In some cases, the visualization recommendation module 250 identifies multiple recommended visualization configurations, such as a quantity or percentage of visualization configurations having associated recommendation scores that exceed the scoring threshold 253. Additionally or alternatively, the visualization recommendation module identifies a particular visualization configuration having a ranking relationship to additional visualization configurations, such as a particular visualization configuration associated with a recommendation score that is highest among the recommendation scores 255, or a group of visualization configurations associated with recommendation scores that are highest-ranking among the scores 255.

In some implementations, the visualization recommendation system 200 generates the visualization recommendation 257 that includes one or more recommendation scores associated with one or more recommended visualization configurations. Additionally or alternatively, the visualization recommendation 257 includes visualization image data, such as the visualization image data 275, that present data values from the input dataset 210 according to the one or more recommended visualization configurations. In some cases, the visualization recommendation system 200 provides the visualization recommendation 257 to one or more additional computing systems, such as the additional computing system 190 or the user device 105 described in regards to FIG. 1. For example, if the visualization recommendation system 200 identifies a group of five recommended visualization configurations from the set 220, the visualization recommendation system 200 provides, to an additional computing device, a recommendation score and visualization image data for each of the five recommended visualization configurations. Additionally or alternatively, a user interface of the additional computing device presents the five recommendation scores and visualization image data, such as to a user of the additional computing device. In some cases, the user of the additional computing device may indicate, via the user interface, a selection of one of the presented visualization image data.

Figure 3:
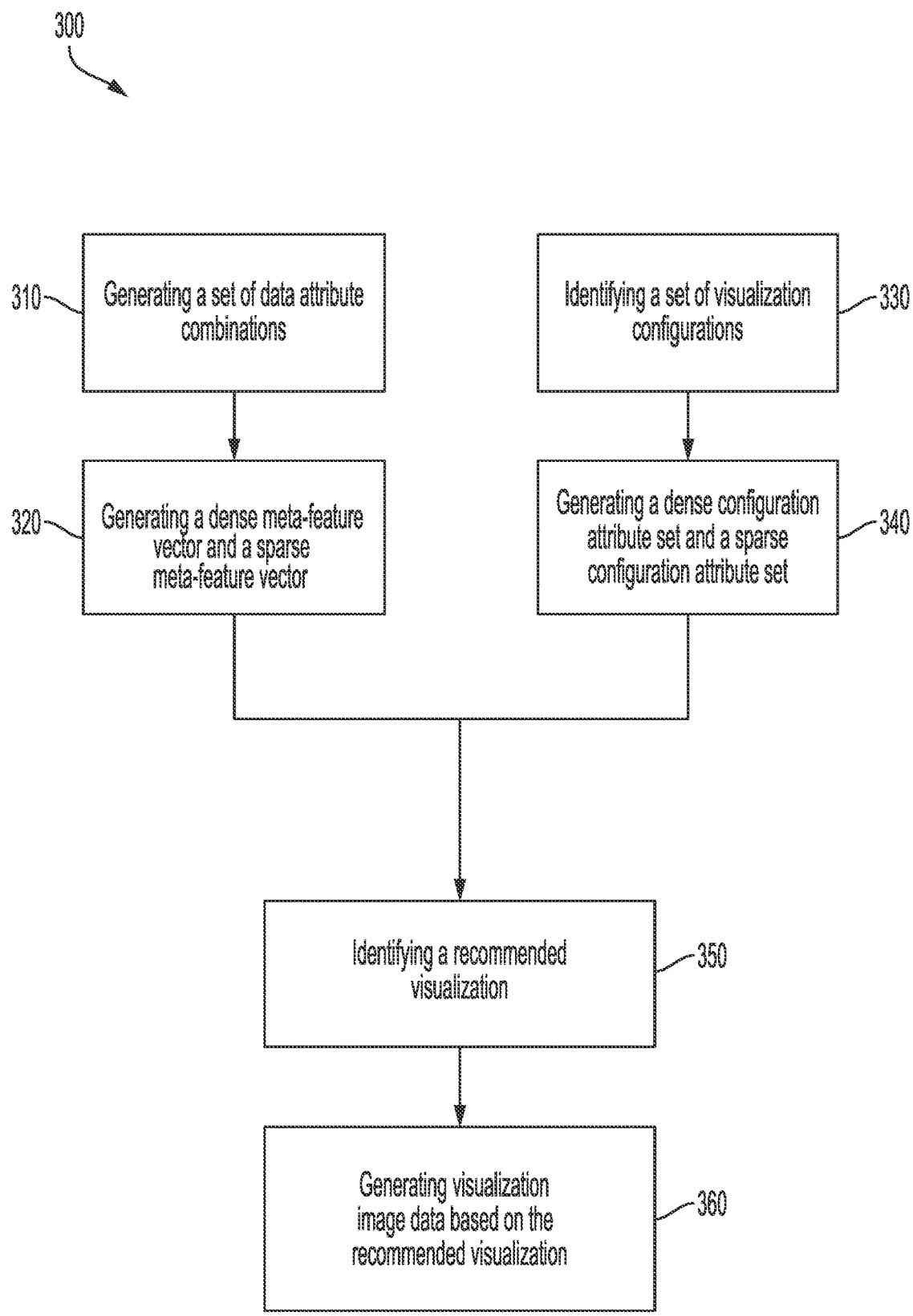
FIG. 3 is a flow chart depicting an example of a process for determining a recommended visualization configuration for a dataset, according to certain embodiments.

FIG. 3 is a flowchart depicting an example of a process 300 for determining a recommended visualization configuration for a dataset. In some embodiments, such as described in regards to FIGS. 1-2, a computing device executing suitable program code, such as visualization software, implements operations described in FIG. 3. For illustrative purposes, the process 300 is described with reference to the examples depicted in FIGS. 1-2. Other implementations, however, are possible. In some embodiments, one or more operations described herein with respect to the process 300 can be used to implement one or more steps for generating a recommendation score for a visualization configuration.

At block 310, the process 300 involves generating a set of data attribute combinations, such as combinations of data attributes of an input dataset. In some embodiments, an attribute feature-extraction module included in a visualization recommendation system determines (or receives) one or more data attributes of an input dataset. Additionally or alternatively, the attribute feature-extraction module generates the set of data attribute combinations by identifying multiple combinations of the data attributes. For example, the attribute feature-extraction module 230 generates the attribute combination set 237 by identifying subsets of the dataset attributes 215.

In some cases, the attribute feature-extraction module (or an additional component of the visualization recommendation system) generates or modifies a meta-feature space in which the data attributes of the input dataset are mapped. For example, the attribute feature-extraction module 230 generates or modifies the meta-feature space 235 to include mappings of the dataset attributes 215.

At block 320, the process 300 involves generating a dense meta-feature vector and a sparse meta-feature vector, such as the dense data attribute set 240 and the sparse data attribute set 242. The dense meta-feature vector and the sparse meta-feature vector are generated, for example, by the attribute feature-extraction module (or an additional component of the visualization recommendation system). In some cases, the dense meta-feature vector identifies meta-features, such as from the meta-feature space, that describe the data attributes of the input dataset. Additionally or alternatively, the sparse meta-feature vector identifies a frequency of the meta-features, such as a frequency of occurrences of the meta-features within the dense meta-feature vector. For example, the attribute feature-extraction module 230 generates the dense data attribute set 240 and the sparse data attribute set 242 by identifying, in the meta-feature space 235, meta-features that describe the data dataset attributes 215. In some cases, the dense meta-feature vector includes meta-features that are associated with one or more attribute combinations included in the set of data attribute combinations.

At block 330, the process 300 involves identifying a set of visualization configurations, such as a set of visualization configurations that are available to be applied to the input dataset. In some cases, each visualization configuration in the set of visualization configurations includes a group of configuration attributes. Additionally or alternatively, the configuration attributes describe visual characteristics of a data visualization. In some cases, the visualization recommendation system identifies (or otherwise receives) the set of visualization configurations. For example, the visualization recommendation system 130 receives one or more visualization configurations from the visualization configuration corpus 187.

In some cases, the attribute feature-extraction module (or an additional component of the visualization recommendation system) generates or modifies a configuration space in which the configuration attributes of the set of visualization configurations are mapped. For example, the attribute feature-extraction module 230 generates or modifies the configuration space 239 to include mappings of the configuration attributes 225. Additionally or alternatively, the attribute feature-extraction module (or an additional component of the visualization recommendation system) generates or modifies a visualization space based on a combination of the meta-feature space and the configuration space. For example, the attribute feature-extraction module 230 generates or modifies the visualization space 233 by mapping vector data from the meta-feature space 235 and the configuration space 239 to positions within the visualization space 233.

At block 340, the process 300 involves generating a dense configuration attribute set and a sparse configuration attribute set. The dense configuration attribute set and the sparse configuration attributes set are generated, for example, by the attribute feature-extraction module (or additional components of the visualization recommendation system). In some cases, the dense configuration attribute set identifies configuration attributes configuration attributes, such as from the configuration space, that are associated with each particular visualization configuration in the set of visualization configurations. Additionally or alternatively, the sparse configuration attribute set identifies a frequency of the configuration attributes in the dense configuration attribute set. For example, the attribute feature-extraction module 230 generates the dense configuration attribute set 245 and the sparse configuration attribute set 247 by identifying, in the configuration space 239, groups of the configuration attributes 225 respectively associated with particular visualization configurations from the set 220.

At block 350, the process 300 involves identifying a recommended visualization, such as a recommended visualization configuration for the input dataset. In some cases, a visualization recommendation module included in the visualization recommendation system determines the recommended visualization. In some implementations, the recommended visualization is identified based on one or more of the sparse configuration attribute set, the sparse meta-feature vector, the dense configuration attribute set, or the dense meta-feature vector. For example, the visualization recommendation module 250 generates one or more of the recommendation scores 255 by calculating, at least, the wide score 266. Additionally or alternatively, the wide model 265 generates the wide score 266 by determining frequently co-occurring feature-pairs across the sparse data attribute set 242 and the sparse configuration attribute set 247. In some cases, the recommendation scores 255 are calculated from, at least, the deep score 268 generated by the deep model 267 by determining feature-pairs that co-occur frequently within a small number of visualizations from the dense data attribute set 240 and the dense configuration attribute set 245.

In some cases, the recommended visualization indicates a combination of a particular visualization configuration from the set of visualization configurations and a particular meta-feature describing a particular data attribute combination from the dense meta-feature vector. For example, the visualization scoring model 260 generates each of the recommendation scores 255 for respective visualization configurations from the set 220. In some cases, a particular one of the recommendation scores 255 indicates one or more meta-features from the meta-feature space 235 that describe a particular attribute combination, e.g., from the attribute combination set 237, that is represented in the dense data attribute set 240.

At block 360, the process 300 involves generating visualization image data based on the recommended visualization. The visualization image data is generated, for instance, with data values from the input dataset. In some cases, a visualization presentation module included in the visualization recommendation system generates the visualization image data. For example, the visualization presentation module 270 generates the visualization image data 275 by combining data values from the input dataset 210 with a particular visualization configuration identified in the visualization recommendation 257. In some cases, the visualization recommendation system causes a user interface to display the visualization image data. For example, the visualization presentation module provides one or more of the recommended visualizations (e.g., a recommendation score, a recommended visualization configuration) or the visualization image data to an additional computing system, such as to one or more of the user device 105 or the additional computing system 190.

In some embodiments, one or more operations related to the process 300 are repeated for multiple datasets, such as multiple training datasets. Additionally or alternatively, operations related to the process 300 are repeated for multiple data attributes, configuration attributes, or other data or derived data for a dataset. For example, one or more operations related to block 320 could be repeated for each combination of data attributes in the set of data attribute combinations. As an additional example, one or more operations related to block 350 could be repeated for multiple visualization configurations applied to multiple data attribute combinations, such as calculating a recommendation score for multiple combinations from the visualization configuration set 220 and the attribute combination set 237.

In some implementations, one or more components of a visualization recommendation system apply one or more rules-based operations to identify a recommended visualization. For example, the attribute feature-extraction module 230 generates one or more specialized data structures—such as the spaces 233, 235, or 239, or the attribute sets 240, 242, 245, or 247—by applying one or more rules-based operations for generating a vector space or generating an attribute set. Additionally or alternatively, the visualization recommendation module 250 calculates one or more recommendation scores by applying at least one scoring model that is trained to implement one or more rules-based operations for scoring a visualization configuration. In some cases, rules-based operations implemented by a visualization recommendation system include, for example, mathematical determinations of a vector space, an attribute set, parameters of an objective function for a model, or other values applied by the visualization recommendation system. Equations 1-19 describe non-limiting examples of rules-based operations for identifying a recommended visualization.

Equation 1, for instance, describes a non-limiting example of a calculation to determine a candidate visualization for one or more datasets (including, for example, an input dataset or a training dataset).

$$\mathcal{V}_{ik} = (X_i^{(k)}, C_{ik}) \qquad \text{Eq. 1}$$

In Equation 1, a visualization $\mathcal{V}_{ik}$ is determined for the ith dataset in a group of datasets, with respect to a visualization configuration $C_{ik}$. The ith dataset has dataset attributes $X_i$, such as dataset attributes for a training dataset or an input dataset. In Equation 1, the visualization $\mathcal{V}_{ik}$ is determined for a kth combination of dataset attributes $X_i^{(k)}$ for the ith dataset, such as an attribute combination from the attribute combination set 237. The visualization configuration $C_{ik}$ from a set of visualization configurations, such as the visualization configuration set 220, has configuration attributes, such as the configuration attributes 225. In some cases, one or more of the visualization $\mathcal{V}_{ik}$, the dataset attributes $X_i^{(k)}$, or the visualization configuration $C_{ik}$ include vector data, such as vectors of values describing characteristics of the visualization, dataset, or visualization configuration indicated in Equation 1. In some cases, the ith dataset having the attributes $X_i^{(k)}$ belongs to a training dataset D, such as a training dataset in the training dataset corpus 185. Additionally or alternatively, the ith dataset having the attributes $X_i^{(k)}$ is an input dataset, such as the input dataset 210 having the dataset attributes 215, that does not belong to a group of training datasets. In some cases, the dataset attributes $X_i^{(k)}$ are included (or represented by meta-features) in a meta-feature space, such as via meta-features mapped to the meta-feature space 235. Additionally or alternatively, the visualization configuration $C_{ik}$ is included in a configuration space C, such as the configuration space 239. Additionally or alternatively, the visualization $\mathcal{V}_{ik}$ is included in a visualization space, such as the visualization space 233.

In some implementations, one or more components of a visualization recommendation system, such as the attribute feature-extraction module 230, generates a data structure describing a set of attribute combinations, such as the attribute combination set 237. Equations 2-4 describe non-limiting example calculations to determine a set of attribute combinations for data attributes of one or more datasets. In some cases, the Equations 2-4 are calculated for an ith dataset in a group of datasets, the ith dataset having attributes $X_i$, such as described in regards to Equation 1.

$$\Sigma : X_i \to \chi_i \qquad \text{Eq. 2}$$

$$\chi_i = \{X_i^{(1)}, \ldots X_i^{(k)}, \ldots X_i^{(N)}\} \qquad \text{Eq. 3}$$

In Equation 2, a particular attribute combination $X_i$ is included in attribute combination set $\chi_i$. For example, the particular attribute combination $X_i$ is calculated from the attributes $X_i$ of the ith dataset. In Equation 3, the attribute combination set $\chi_i$ includes N combinations of the dataset attributes $X_i$. In regards to Equations 2-4, $\Sigma$ is an attribute combination generation function configured to generate one or more attribute combinations from the attributes $X_i$. As a non-limiting example, Equation 4 describes an example attribute combination set $\chi_P$ for an example dataset P having three attributes $X_P == [x_1\ x_2\ x_2]$, calculated by applying one or more of the Equations 2-3 to the example dataset P.

$$\chi_P = \left\{ \begin{array}{c} \frac{x_1, x_2, x_3,}{\Sigma_1(X)} \\ \frac{[x_1 x_2], [x_1, x_3], [x_2, x_3],}{\Sigma_2(X)} \\ \frac{[x_1, x_2, x_3]}{\Sigma_3(X)} \end{array} \right\} \qquad \text{Eq. 4}$$

In regards to Equations 2-4, the attribute combination generation function $\Sigma$ generates attribute combinations that include one, some, or all attributes of a dataset. Additionally or alternatively, the attribute combination generation function $\Sigma$ generates all possible attribute combinations of the attributes. In some cases, the attribute combination set $\chi_i$ is a large data structure that includes a large quantity of attribute combinations. For instance, applying Equation 2 to an example dataset having about thirty dataset attributes generates an attribute combination set including more than one million attribute combinations.

In some implementations, the visualization $\mathcal{V}_{ik}$, such as described in regards to Equation 1, is determined for the kth combination of dataset attributes $X_i^{(k)}$ from the attribute combination set $\chi_i$, such as described in regards to Equation 2. In some cases, a visualization space is generated from multiple visualizations that combine multiple visualization configurations with multiple attribute combinations. For example, the visualization space 233 is generated or modified to include combinations of configuration attributes (e.g., in the configuration space 239) from visualization configurations in the set 220 with meta-features (e.g., in the meta-feature space 235) of data attributes from the attribute combination set 237. Equations 5-6 describe non-limiting example calculations to determine a visualization space that includes some or all possible combinations of multiple visualization configurations with multiple data attribute combinations. In some cases, the Equations 5-6 are calculated for an attribute combination set $\chi_i$ of an ith dataset and a visualization configuration $C_{ik}$ included in a configuration space $\mathcal{C}$, such as described in regards to Equations 1-4.

$$\xi : \chi_i \times \mathcal{C} \to \mathbb{V}_i^* \qquad \text{Eq. 5}$$

$$\xi(\Sigma(C_i), \mathcal{C}) = \mathbb{V}_i^* \qquad \text{Eq. 6}$$

In Equation 5, a visualization space $\mathbb{V}_i^*$ includes combinations of attribute combinations of the ith dataset with visualization configurations. For example, the visualization space $\mathbb{V}_i^*$ includes combinations of each attribute combination from the attribute combination set $\chi_i$, such as described in regards to Equation 2, with each visualization configuration $C_{ik}$ included in a configuration space $\mathcal{C}$, such as described in regards to Equation 1. In regards to Equations 5-6, $\xi$ is a visualization mapping function configured to map attributes of a cross product between an attribute combination and a visualization configuration to the visualization space $\mathbb{V}_i^*$. In Equation 6, the visualization space $\mathbb{V}_i^*$ includes each visualization that is generated by applying the visualization mapping function $\xi$ to each attribute combination of the ith dataset (e.g., applying attribute combination generation function $\Sigma$ to dataset attributes $X_i$, as described in regards to Equations 2-4) and each visualization configuration of the configuration space $\mathcal{C}$. In some cases, the visualization mapping function $\xi$ is a learnable function, such as a function learned during training of the attribute feature-extraction module 230 or another machine-learning component of the visualization recommendation system 200.

In regards to Equations 5-6, the visualization mapping function $\xi$ maps attributes of one, some, or all possible visualizations that combine multiple attribute combinations and multiple visualization configurations. In some cases, the visualization space $\mathbb{V}_i^*$ is a large data structure that includes (or otherwise represents) a large quantity of possible visualizations for the ith dataset. For instance, continuing with the above example dataset having about thirty dataset attributes, applying one or more of Equations 5-6 generates a visualization space that maps visualizations for each of the more than one million attribute combinations for the example dataset combined with each visualization configuration in the configuration space $\mathcal{C}$.

In some implementations, a visualization recommendation system is trained based on a visualization space that is generated for one or more training datasets. For example, the visualization recommendation system 200 generates the visualization space 233 using training datasets (e.g., from the training dataset corpus 185) combined with visualization configurations (e.g., from the visualization configuration corpus 187). In some cases, each particular one of the training datasets includes an indication of a particular visualization configuration that is selected to visualize the particular training dataset, such as a visualization configuration that is selected by a user. For example, the training datasets indicate which visualization configurations were selected, such as by a user, to represent the training datasets for interpretation or comprehension by the user. In some cases, ground-truth labels are generated for the training datasets, indicating the particular visualization configuration (or visualization configurations) selected for each of the training datasets. Additionally or alternatively, the visualization space $\mathbb{V}_i^*$ for a particular dataset i includes a ground-truth label for one or more visualizations included visualization space, such as a ground-truth labels indicating whether a particular visualization was selected for the dataset i. In some cases, one or more models included in a visualization recommendation system are trained using ground-truth labels that are indicated by a visualization space. For example, one or more scoring models can be trained by comparing an output of the scoring model (e.g., output recommendation scores) to the ground-truth labels.

In some cases, a component of a visualization recommendation system, such as an attribute feature-extraction module, generates (or otherwise indicates) one or more portions of a visualization space for a particular training dataset. In some cases, the portions of the visualization space are identified using one or more ground-truth labels for the particular training dataset. For example, the attribute feature-extraction module 230 identifies one or more positive visualizations in the visualization space 233. The positive visualizations for a particular training dataset are identified, for instance, as having ground-truth labels that indicate that one or more users selected a particular visualization to represent the particular training dataset. Additionally or alternatively, attribute feature-extraction module 230 identifies one or more negative visualizations in the visualization space 233. The negative visualizations for the particular training dataset are identified, for instance, as having ground-truth labels that indicate that the particular training dataset was not selected by a user to represent the particular training data. In some cases, the particular training dataset has a large quantity of negative visualizations (e.g., users commonly selected one of a small number of visualizations to represent the training dataset). In some cases, a component of a visualization recommendation system generates a sample set of the negative visualizations for a particular training dataset. For instance, the attribute feature-extraction module 230 samples the negative visualizations for a particular training dataset uniformly at random. A data structure that includes the sampled negative visualizations for the particular training dataset can have a reduced size, as compared to an additional data structure that includes all negative visualizations for the particular training dataset. In some cases, training of the visualization recommendation system 200 using sampled negative visualizations for one or more training datasets is more computationally efficient, as compared to training using all negative visualizations for the training datasets.

In some implementations, a component of a visualization recommendation system extracts or otherwise receives meta-features that describe data attributes of one or more datasets. For example, the attribute feature-extraction module 230 extracts meta-features from one or more of the input dataset 210 or training datasets. Equations 7-13 describe non-limiting example calculations to extract one or more meta-features that describe data attributes of a dataset. In some cases, the Equations 7-13 are calculated for an ith dataset in a group of datasets, the ith dataset having attributes $X_i$, such as described in regards to Equations 1-6.

$$\Psi: x \to \mathbb{R}^K \qquad \text{Eq. 7}$$

$$X_i = \{x_1, x_2, \ldots, x_M\} \qquad \text{Eq. 8}$$

$$\Psi: X \to \mathbb{R}^{K \times M} \qquad \text{Eq. 9}$$

In Equation 7, an attribute x is mapped to a meta-feature space $\mathbb{R}$ having K dimensions. For example, an attribute from the dataset attributes 215 is mapped as a meta-feature to the meta-feature space 235. Equation 8 describes an example set of M attributes $x_1$ through $x_M$ that are included in the dataset attributes $X_i$. In Equation 9, the M attributes are mapped to a dimension of the meta-feature space $\mathbb{R}$ such that the space has dimensions K×M. For example, the meta-feature space $\mathbb{R}^{K \times M}$ includes vector data describing K dimensions combined with M additional dimensions. In Equation 7, the meta-feature space $\mathbb{R}$ is shared among meta-features of multiple datasets. For example, the meta-feature space 235 is shared among meta-features mapped from one or more of the input dataset 210 or multiple training datasets, such as from the training dataset corpus 185.

In regards to Equations 7-9, $\Psi$ is a meta-feature learning function configured to map an attribute, including the attributes $x_1$ through $x_M$, to the meta-feature space $\mathbb{R}$. Examples of meta-features extracted from a dataset can include (without limitation) a quantity of values, a quantity of missing values, quartiles of data values, a median, a range, a signal-to-noise ratio, a correlation analysis, or any other suitable meta-feature. In some cases, the meta-feature learning function $\Psi$ is a learnable function, such as a function learned during training of the attribute feature-extraction module 230 or another machine-learning component of the visualization recommendation system 200.

In some cases, meta-features are extracted based on a transformation of data values from a dataset. For example, one or more of Equations 7-9 could be applied to a dataset that is derived from an additional dataset. The attribute feature-extraction module 230, for instance, could modify the meta-feature space 235 to include meta-features of one or more derived datasets that describe a probability distribution of the input dataset 210, normalized data values of the dataset 210, partitioned values of the input dataset 210 (e.g., clustered values, binned values, quartiles of values), scaled values of the input dataset 210, or other types of datasets that are derived from an input (or training) dataset.

In some implementations, the meta-feature learning function $\Psi$ is applied to attributes of a particular dataset and to attributes of derived datasets of the particular dataset. Additionally or alternatively, the meta-feature space $\mathbb{R}$ includes meta-features extracted from the particular dataset and the derived datasets of the particular dataset. Equations 10-13, for instance, describe non-limiting calculations for extracting meta-features that describe data attributes of derived datasets.

$$\Psi(X_i) = \Psi_1(X_i), \ldots, \Psi_R \vartheta X_i) \qquad \text{Eq. 10}$$

$$\Psi(\Pi(X_i)) = \Psi_1(\Pi_1(X_i)) \ldots, \Psi_1(\Pi_k(X_i)) \qquad \text{Eq. 11}$$

$$\Psi(p(X_i)) = \Psi_1(p(X_i)), \ldots, \Psi_1(p(X_i)) \qquad \text{Eq. 12}$$

$$\Psi(\Pi(p(X_i)) = \Psi_1(\Pi_1(p(X_i))), \ldots, \Psi_1(\Pi_k(p(X_i))) \qquad \text{Eq. 13}$$

In Equation 10, the meta-feature learning function $\Psi$ includes functions that are applied to the dataset attributes $X_i$, such as described in regards to Equations 7-9. For example, a quantity of R functions $\Psi_1$ through $\Psi_R$ are applied to the dataset attributes $X_i$. In Equation 11, a partitioning function Π applied to the dataset attributes $X_i$ generates a quantity of k partitions of attributes, such that the meta-feature learning function Ψ is applied to partitioned dataset attributes that are derived from the dataset attributes $X_i$. In Equation 12, the meta-feature learning function Ψ is applied to attributes of a derived dataset, such as the probability distribution $p(X_i)$ of the dataset attributes $X_i$. In some cases, multiple types of derivations may be applied to a dataset. In Equation 13, the partitioning function Π is applied to the probability distribution $p(X_i)$, such that the meta-feature learning function Ψ is applied to partitioned and probability-distributed dataset attributes that are derived from the dataset attributes $X_i$. In some cases, a visualization recommendation system that generates a recommendation score utilizing meta-features of derived datasets can more accurately identify a recommended visualization, as compared to a visualization recommendation system that does not utilize meta-features of derived datasets. In some cases, a meta-feature space that includes meta-features generated via one or more of Equations 7-13 is a large data structure that includes a large quantity of mapped meta-features, such as a large vector data structure that represents meta-features of a dataset and multiple derived datasets.

In some implementations, a component of a visualization recommendation system generates or otherwise receives a configuration space in which configuration attributes are mapped. The mapped configuration attributes describe, for example, attributes of one or more configuration visualizations, such as visualization configurations that could be applied to a dataset. In some cases, the attribute feature-extraction module 230 generates the configuration space 239 by applying a mapping learning function to the configuration attributes 225. The mapping learning function can, for instance, apply one or more extraction functions to generate vector data representing configurations attributes within the configuration space. In some implementations, the mapping learning function may, but need not, include learning functions such as described in regards to Equations 7-13. Additionally or alternatively, the mapping learning function can include learning functions that are mathematically independent of the learning functions described in regards to Equations 7-13.

In some implementations, an attribute feature-extraction module, or an additional component of a visualization recommendation system, generates one or more dense attribute sets that indicate one or more meta-features or attributes that are mapped to a space (e.g., a vector space). For instance, the attribute feature-extraction module 230 generates or modifies the dense data attribute set 240 and the dense configuration attribute set 245 to indicate, respectively, meta-features mapped to the meta-feature space 235 and configuration attributes mapped to the configuration space 239.

Equation 14 describes a non-limiting example calculation to generate a dense data attribute set.

$$d_x = \phi_1( \ldots d_{x_{ij}} \ldots ) = \begin{bmatrix} \vdots \\ d_{x_{ij}} \\ \vdots \end{bmatrix} \qquad \text{Eq. 14}$$

In Equation 14, the dense data attribute set $d_x$ includes meta-features describing each attribute $x_i$ from the dataset having attributes $X_i$, such as described in regards to Equations 1-13. For example, meta-features of the jth attribute $x_{ij}$ are represented by a respective dense feature $d_{x_{ij}}$ in the dense data attribute set $d_x$. In regards to Equation 14, $\phi_1$ is a concatenation function configured to concatenate the dense features $d_{x_{ij}}$ for each of the attributes $x_i$ from the dataset having attributes $X_i$. A vector $$\begin{bmatrix} \vdots \\ d_{x_{ij}} \\ \vdots \end{bmatrix}$$

includes vector data representing the concatenated dense features $d_{x_i}$.

Equations 15-17 describe non-limiting example calculations to generate a dense configuration attribute set. In some cases, the Equations 15-17 are calculated for a visualization configuration $C_{ik}$ included in a configuration space $\mathcal{C}$, such as described in regards to Equations 1-4.

$$\mathcal{H} : C_{ik} \to \mathbb{R}^K \qquad \text{Eq. 15}$$

$$\mathcal{H} : \mathcal{C} \to \mathbb{R}^{K \times M} \qquad \text{Eq. 16}$$

$$d_c = \mathcal{H} (\text{one\_hot}(C_{ik})) \qquad \text{Eq. 17}$$

In Equation 15, configuration attributes of the visualization configuration $C_{ik}$ are mapped to a configuration space $\mathbb{R}^K$ having K dimensions. For example, an attribute from the configuration attributes 225 is mapped to the configuration space 239. In Equation 16, all visualization configurations $C_{ik}$ in a configuration space $\mathcal{C}$ are mapped to a shared configuration space $\mathbb{R}^K$. In regards to Equations 15-17, $\mathcal{H}$ is an embedding function configured to map configuration attributes of the visualization configuration $C_{ik}$ are mapped to the shared configuration space $\mathbb{R}^K$. In some cases, the embedding function $\mathcal{H}$ is a learnable function, such as a function learned during training of the attribute feature-extraction module 230 or another machine-learning component of the visualization recommendation system 200.

In some implementations, the shared configuration space $\mathbb{R}^K$ is a shared space with the meta-feature space $\mathbb{R}$ described in regards to Equations 7-9. For example, configuration attributes of the visualization configurations $C_{ik}$ and the meta-features extracted from the dataset attributes $X_i$ are mapped to the shared space $\mathbb{R}$, such that relationships among the configuration attributes and the meta-features can be determined within the shared space $\mathbb{R}$. The attribute feature-extraction module 230, for instance, generates the configuration space 239 that includes all possible visualization configurations $C_{ik}$ in a configuration space $\mathcal{C}$. Additionally or alternatively, the attribute feature-extraction module 230 could generate a shared space by modifying the meta-feature space 235 to include configuration attributes that are mapped via the embedding function $\mathcal{H}$. In regards to Equations 15-17, the configuration space $\mathcal{C}$ has M dimensions, such that mapping all visualization configurations $C_{ik}$ generates the shared configuration space $\mathbb{R}^K$ with size M.

In Equation 17, the dense configuration attribute set $d_c$ includes data that encodes the mapping of the visualization configurations $C_{ik}$ within the shared space $\mathbb{R}$. For example, a one-hot encoding of each visualization configuration $C_{ik}$ is determined within the configuration space $\mathcal{C}$, such as by the attribute feature-extraction module 230. In Equation 17, the embedding function $\mathcal{H}$ is applied to the one-hot encodings. Additionally or alternatively, the dense configuration attribute set $d_c$ includes vector data representing the encodings of the visualization configurations $C_{ik}$ that are embedded in, for instance, the shared space $\mathbb{R}$.

In some implementations, an attribute feature-extraction module, or an additional component of a visualization recommendation system, generates one or more sparse attribute sets that indicate a frequency of one or more meta-features or attributes that are mapped to a space (e.g., a vector space). For instance, the attribute feature-extraction module 230 generates or modifies the sparse data attribute set 242 and the sparse configuration attribute set 247 to indicate, respectively, meta-features mapped to the meta-feature space 235 and configuration attributes mapped to the configuration space 239.

In some cases, a sparse data attribute set $s_x$ is generated based on the dense data attribute set $d_x$ described in regards to Equation 14. For example, the attribute feature-extraction module 230 determines one or more groups of meta-features indicated by the dense data attribute set $d_x$, such as bin-buckets of values or clusters of dimensions that are represented in the dense data attribute set $d_x$. In some cases, the sparse data attribute set $s_x$ includes vector data that indicates a frequency of meta-features within the dense data attribute set $d_x$, such as data indicating how many of the clusters or bin-buckets include a particular meta-feature.

Additionally or alternatively, a sparse configuration attribute set $s_c$ is generated based on the dense configuration attribute set $d_c$ described in regards to Equation 17. For example, the attribute feature-extraction module 230 determines an encoding of a particular configuration attribute in the visualization configurations $C_{ik}$, such as a configuration attribute indicating "marker_type=circle" or an additional suitable configuration attribute. For each of the visualization configurations $C_{ik}$ that include the example "marker_type=circle" configuration attribute, the sparse configuration attribute set $s_c$ includes vector data indicating which of the visualization configurations $C_{ik}$ include the example configuration attribute. Additionally or alternatively, the attribute feature-extraction module 230 generates the sparse configuration attribute set $s_c$ by including the one-hot encoding of the visualization configurations $C_{ik}$ described in regards to Equation 17.

In some implementations, a component of a visualization recommendation system, such as a visualization recommendation module, applies at least one scoring model to generate a recommendation score for a visualization configuration. For example, the visualization recommendation module 250 applies the visualization scoring model 260, the wide model 265, or the deep model 267 to one or more of the input dataset 210 or training datasets. Equations 18-19 describe non-limiting example calculations to generate recommendation scores for visualization configurations with respect to a dataset. In some cases, the Equations 18-19 are calculated for one or more of the visualization configurations $C_{ik}$ with respect to an ith dataset in a group of datasets, the ith dataset having attributes $X_i$, such as described in regards to Equations 1-17. Additionally or alternatively, the Equations 18-19 are calculated using multiple dense or sparse attribute sets, such as the dense attribute sets $d_x$ and $d_c$ and the sparse attribute sets $s_x$ and $s_c$ described in regards to Equations 14-17.

$$\hat{Y}_{ik} = \mathcal{M}(\mathcal{V}_{ik}) = f(X_i^{(k)}, C_{ik}|\Theta) \in [0,1] \qquad \text{Eq. 18}$$

$$\hat{Y}_{ik} = \sigma(w_{wide} f_{wide}(s_c, s_x|\Theta_s) + w_{deep} f_{deep}(d_c, d_x|\Theta_d)) \qquad \text{Eq. 19}$$

In Equation 18, a recommendation score $\hat{Y}_{ik}$ is generated by applying a scoring model $\mathcal{M}$ to a visualization $\mathcal{V}_{ik}$. In some cases, the visualization $\mathcal{V}_{ik}$ is for a visualization configuration $C_{ik}$ and a kth attribute combination $X_i^{(k)}$ (e.g., from an attribute combination set $\chi_i$) for the ith dataset having attributes $X_i$, such as described in regards to Equations 1-3. In Equation 18, the recommendation score $\hat{Y}_{ik}$ can include a value between 0 and 1, such as a value 0 indicating a poor recommendation score (e.g., visualization configuration $C_{ik}$ is not recommended for the attribute combination $X_i^{(k)}$) or a value 1 indicating a high recommendation score (e.g., visualization configuration $C_{ik}$ is not recommended for the attribute combination $X_i^{(k)}$). In some cases, the scoring model $\mathcal{M}$ is a learnable model. For example, the scoring model $\mathcal{M}$ could be learned during training of one or more of the visualization scoring model 260, the wide model 265, or the deep model 267. In some cases, one or more of the scoring model $\mathcal{M}$, the embedding function $\mathcal{H}$, the visualization mapping function $\xi$, the meta-feature learning function $\Psi$, or additional functions described herein are trained together during a particular training session.

In Equation 18, the scoring model $\mathcal{M}$ can include a scoring function f that is configured to calculate the recommendation score $\hat{Y}_{ik}$ using a set of parameters $\Theta$. The parameters $\Theta$ are determined, for example, by training the scoring model $\mathcal{M}$ on multiple training datasets that are associated with visualization configurations. In some cases, the scoring model $\mathcal{M}$ is trained using a visualization space $\mathbb{V}_i^*$ that includes combinations of attribute combinations with visualization configuration $C_{ik}$, such as described in regards to equations 5-6. Training of the scoring model $\mathcal{M}$ can be performed by utilizing one or more of positive visualizations, negative visualizations, or sampled visualizations. For example, one or more of the models 260, 265, or 267 in the visualization recommendation module 250 are trained to identify relationships among vector data representing visualization configurations associated with training datasets, such as visualizations included in the visualization space 233.

In some cases, the parameters $\Theta$ include one or more of wide model parameters $\Theta_s$ or deep model parameters $\Theta_x$ determined for sub-models of the scoring model $\mathcal{M}$, such as a wide model and a deep model. Equation 19, for instance, describes an example calculation to generate the recommendation score $\hat{Y}_{ik}$ using a combination of a wide score calculated based on a scoring function $f_{wide}$ and a deep score calculated based on a scoring function $f_{deep}$. For example, the scoring function $f_{wide}$ calculates a wide score by applying the wide model parameters $\Theta_s$ to the sparse attribute sets $s_x$ and $s_c$. Additionally or alternatively, the scoring function $f_{deep}$ calculates a deep score by applying the deep model parameters $\Theta_x$ to the deep attribute sets $d_x$ and $d_c$. In some cases, one or more of the parameters $\Theta$, the wide model parameters $\Theta_s$ or the deep model parameters $\Theta_x$ are represented as a vector of parameters. In Equation 19, the wide score and the deep score are combined, such as a sum of the wide score and the deep score from the scoring functions $f_{wide}$ and $f_{deep}$. In some cases, the combination of the wide score and the deep score is weighted by a weight $w_{wide}$ applied to the wide score and a weight $w_{deep}$ applied to the deep score. In Equation 19, the recommendation score $\hat{Y}_{ik}$ is calculated by applying a sigmoid function $\nu$ to the weighted combination of the wide score and the deep score.

In Equations 18-19, the scoring model $\mathcal{M}$ is described in regards to the visualization scoring model 260 with the sub-models 265 and 267. However, other implementations are possible, such as implementations that include more or fewer scoring models (or sub-models) or implementations that include models (or sub-models) that are configured to apply additional scoring calculations.

Figure 4:
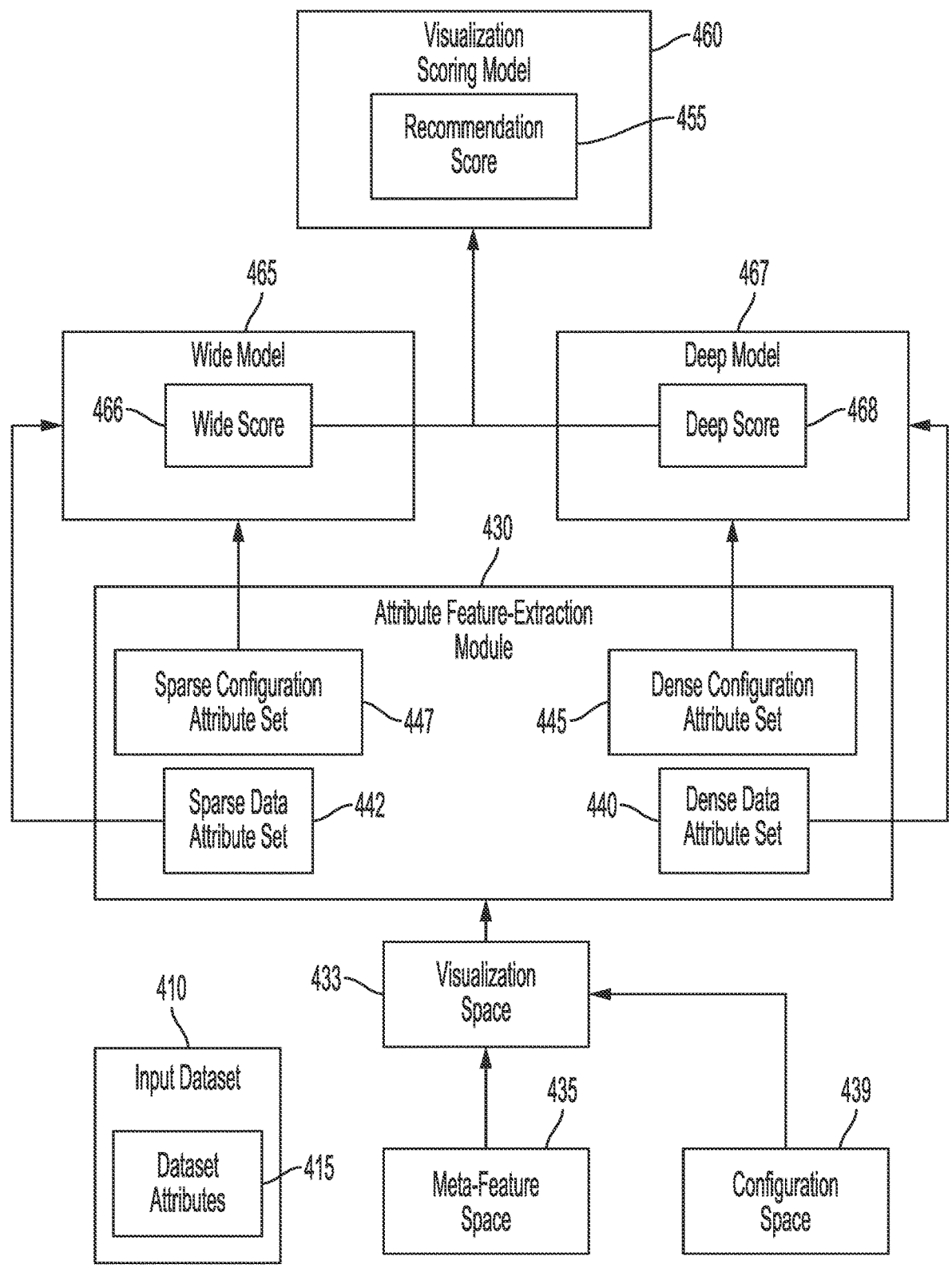
FIG. 4 is a diagram depicting an example architecture of machine-learning components in a visualization recommendation system, according to certain embodiments.

In some implementations, one or more components of a visualization recommendation system are trained to apply one or more of Equations 1-19 to generate a recommendation score for a visualization configuration. In some cases, the visualization recommendation system includes components with trainable machine-learning models that are arranged in an architecture that improves accuracy of the recommendation score. FIG. 4 depicts an example architecture of machine-learning components in a visualization recommendation system, such as the visualization recommendation system 200. In some cases, the visualization recommendation system includes one or more of an attribute feature-extraction module 430, a wide model 465, a deep model 467, or a visualization scoring model 460. One or more of the attribute feature-extraction module 430 or the models 465, 467, or 460 can include a trainable machine-learning component, such as a model that implements one or more of the scoring model $\mathcal{M}$, the embedding function $\mathcal{H}$, the visualization mapping function $\xi$, the meta-feature learning function $\Psi$, or additional functions described herein. Additionally or alternatively, the models or modules depicted in FIG. 4 are arranged to generate or modify data structures by applying rules-based operations, such as rules-based operations described in regards to one or more of Equations 1-19.

In FIG. 4, the attribute feature-extraction module 430 receives one or more of an input dataset 410, a visualization space 433, a meta-feature space 435, or a configuration space 439. In some cases, the attribute feature-extraction module 430 is trainable to generate one or more of the spaces 433, 435, or 439. For example, the attribute feature-extraction module 430 generates the meta-feature space 435 by extracting meta-features from dataset attributes 415 of the input dataset 410 or a training dataset. In some cases, the attribute feature-extraction module 430 applies one or more of Equations 7-13 to the data attributes to generate the meta-feature space 435. Additionally or alternatively, the attribute feature-extraction module 430 generates the configuration space 439 by mapping configuration attributes of multiple configuration visualization (such as each configuration visualization included in the set 220). In some cases, the attribute feature-extraction module 430 generates the visualization space 433 by applying one or more of Equations 1-6 to the dataset attributes 415. For example, the attribute feature-extraction module 430 identifies multiple attribute combinations (such as in the attribute combination set 237) by applying Equations 2-3 to the dataset attributes 415. Additionally or alternatively, the attribute feature-extraction module 430 generates (or modifies) the visualization space 433 to include a large quantity of visualizations by applying Equation 1 to the multiple attribute combinations and the multiple visualization configurations from the configuration space 439.

In some implementations, the attribute feature-extraction module 430 is trainable to generate multiple attribute sets from one or more of the visualization space 433, the meta-feature space 435, or the configuration space 439. For example, the attribute feature-extraction module 430 calculates a dense data attribute set 440 by applying Equation 14 to the meta-feature space 435. Additionally or alternatively, the attribute feature-extraction module 430 calculates a sparse data attribute set 442 from the dense data attribute set 440, as further described in regards to Equation 14. In FIG. 4, the attribute feature-extraction module 430 calculates a dense configuration attribute set 445 by applying Equations 15-17 to one or more of the configuration space 439 or the visualization space 433, and further calculates a sparse configuration attribute set 447 from the dense configuration attribute set 445.

In FIG. 4, a recommendation score 455 is generated based on a combination of calculations performed by multiple scoring models, such as on a combination of a wide score 466 and a deep score 468. For example, the wide model 465 is trainable to calculate the wide score 466 by applying a scoring function $f_{wide}$, such as described in regards to Equations 18-19. Additionally or alternatively, the deep model 467 is trainable to generate the deep score 468 by applying a scoring function $f_{deep}$, such as described in regards to Equations 18-19. Furthermore, the visualization scoring model 460 is trainable to generate the recommendation score 455 by applying a scoring model $\mathcal{M}$, such as described in regards to Equations 18-19. The scoring model $\mathcal{M}$ can include the scoring functions $f_{wide}$ and $f_{deep}$, or can utilize outputs of the scoring functions $f_{wide}$ and $f_{deep}$, such as the wide and deep scores 466 and 468. In some cases, training of the visualization scoring model 460 includes calculating values of the scoring model $\mathcal{M}$, such as the parameters $\Theta$ or weights $w_{wide}$ and $w_{deep}$.

Figure 5:
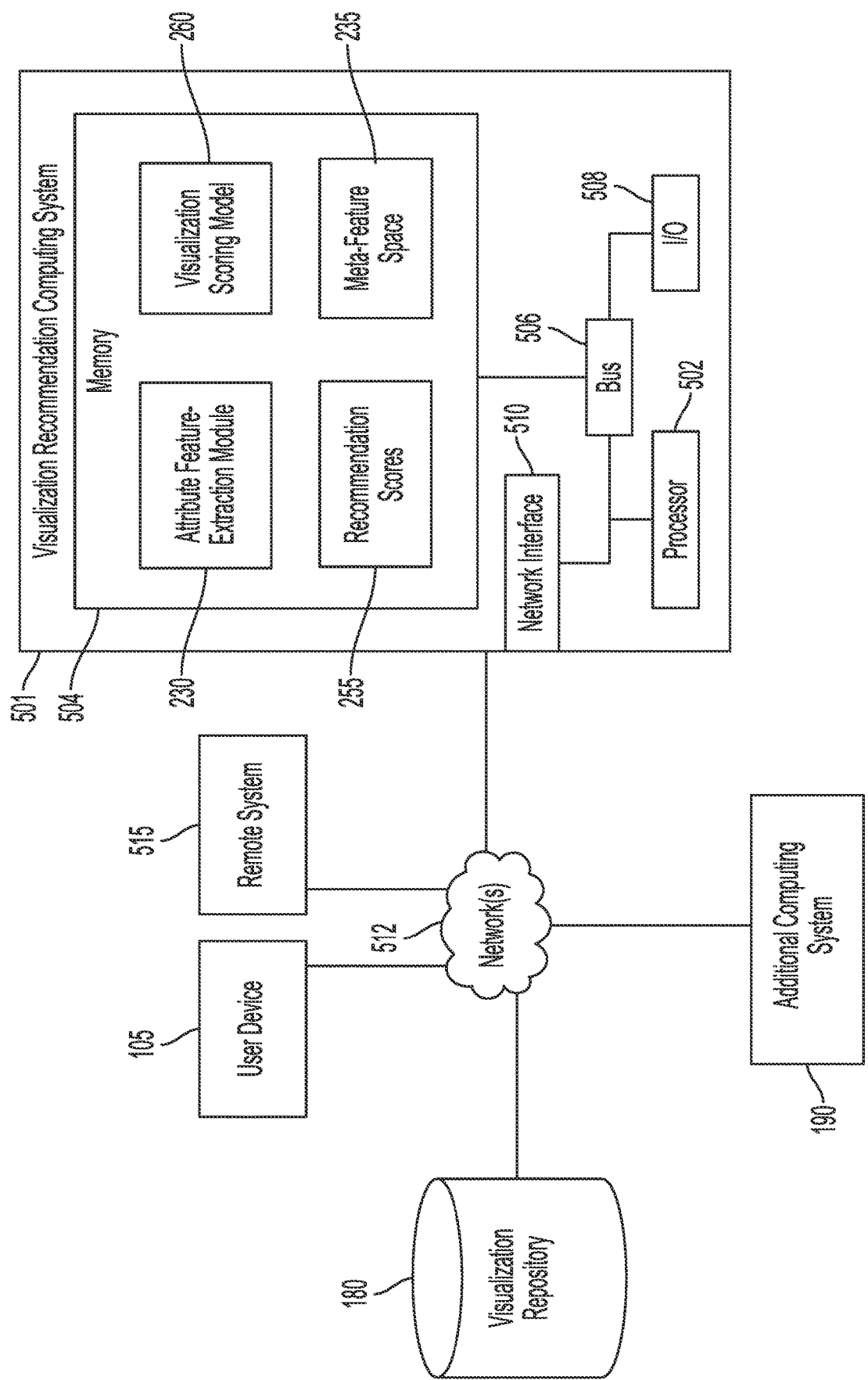
FIG. 5 is a block diagram depicting an example of a computing system for implementing a visualization recommendation system, according to certain embodiments.

Any suitable computing system or group of computing systems can be used for performing the operations described herein. For example, FIG. 5 is a block diagram depicting an example of a computing system configured to implement a visualization recommendation system, according to certain embodiments.

The depicted example of a visualization recommendation computing system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the attribute feature-extraction module 230, the visualization scoring model 260, the meta-feature space 235, the recommendation scores 255, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, JAVA, PYTHON, PERL, JAVASCRIPT, and ACTIONSCRIPT.

The computing system 501 may also include a number of external or internal devices such as input or output devices. For example, the computing system 501 is shown with an input/output ("I/O") interface 508 that can receive input from input devices or provide output to output devices. A bus 506 can also be included in the computing system 501. The bus 506 can communicatively couple one or more components of the computing system 501.

The computing system 501 executes program code that configures the processor 502 to perform one or more of the operations described above with respect to FIGS. 1-4. The program code includes operations related to, for example, one or more of the attribute feature-extraction module 230, the visualization scoring model 260, the meta-feature space 235, the recommendation scores 255, or other suitable applications or memory structures that perform one or more operations described herein. The program code may be resident in the memory device 504 or any suitable computer-readable medium and may be executed by the processor 502 or any other suitable processor. In some embodiments, the program code described above, the attribute feature-extraction module 230, the visualization scoring model 260, the meta-feature space 235, the recommendation scores 255, and other values and data objects are stored in the memory device 504, as depicted in FIG. 5. In additional or alternative embodiments, one or more of the attribute feature-extraction module 230, the visualization scoring model 260, the meta-feature space 235, the recommendation scores 255, and the program code described above are stored in one or more memory devices accessible via a data network, such as a memory device accessible via a cloud service.

The computing system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. In some cases, a remote system 515 is connected to the computing system 501 via network 512, and the remote system 515 can perform some of the operations described herein, such as storing training dataset, identifying data attributes or configuration attributes, or other operations. The computing system 501 is able to communicate with one or more of the remote computing system 515, the user device 105, the visualization repository 180, or the additional computing system 190 using the network interface 510. Although FIG. 5 depicts the visualization repository 180 as connected to computing system 501 via the networks 512, other embodiments are possible, including the visualization repository 180 running as a program in the memory 504, or as a storage device included in the computing system 501.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for generating a recommended visualization of a dataset, the system comprising:
   a processing device; and
   a memory device in which instructions executable by the processing device are stored for configuring the processing device to perform operations including:
      generating, from data attributes of an input dataset, a set of data attribute combinations;
      modifying a meta-feature space that describes training meta-features of training datasets, wherein the modified meta-feature space includes first vector data describing i) meta-features extracted from the data attributes and ii) the training meta-features;
      generating a set of multiple dense meta-feature vectors that includes, for each particular data attribute combination in the set of data attribute combinations, a respective dense meta-feature vector that includes respective meta-features describing the particular data attribute combination from the set of data attribute combinations;
      generating a sparse meta-feature vector identifying a frequency of occurrences of the respective meta-features within the set of multiple dense meta-feature vectors;
      identifying a set of visualization configurations, each visualization configuration including respective configuration attributes that describe visual characteristics of a dataset visualization;
      accessing a configuration space that describes the set of visualization configurations, wherein the configuration space includes second vector data describing, for the each visualization configuration in the set of visualization configurations, the respective configuration attributes included in the each visualization configuration;

accessing a visualization scoring model that includes a wide scoring model and a deep scoring model, wherein the visualization scoring model is trained based on a visualization space that includes third vector data describing relationships of i) the training meta-features described by the meta-feature space with ii) the respective configuration attributes included in the each visualization configuration in the set of visualization configurations described by the configuration space;

generating (i) a dense configuration attribute set identifying the respective configuration attributes included in the each visualization configuration in the set of visualization configurations and (ii) a sparse configuration attribute set identifying a frequency of the respective configuration attributes in the dense configuration attribute set;

calculating, by the visualization scoring model and for the each visualization configuration in the set of visualization configurations, a respective recommendation score that is a combination of a respective wide score calculated by the wide scoring model and a respective deep score calculated by the deep scoring model;

identifying, based on the respective recommendation score for the each visualization configuration in the set of visualization configurations, a particular recommended visualization having a combination of (i) a particular visualization configuration from the set of visualization configurations and (ii) a particular meta-feature describing a particular data attribute combination from the dense meta-feature vector;

generating visualization image data based on the particular recommended visualization; and causing a user interface to display the visualization image data.

2. The system of claim 1, wherein generating the set of data attribute combinations comprises identifying at least one combination of data attributes of the input dataset, wherein at least one meta-feature in the set of multiple dense meta-feature vectors describes the at least one combination of data attributes.

3. The system of claim 1, the processing device further configured to perform operations including:

generating the visualization space, wherein the visualization space includes a combination of a first data attribute combination from the set of data attribute combinations with the each visualization configuration in the set of visualization configurations.

4. The system of claim 3, the processing device further configured to perform operations including:

calculating a recommendation score for each combination of the first data attribute combination from the set of data attribute combinations with the each visualization configuration in the set of visualization configurations; and identifying a first recommendation score having a ranking relationship to a second recommendation score, wherein identifying the recommended visualization is based on the first recommendation score having a higher ranking as compared to the second recommendation score.

5. The system of claim 1, the processing device further configured to perform operations including:

mapping the respective configuration attributes included in the each visualization configuration in the set of visualization configurations to the configuration space.

6. The system of claim 1, the processing device further configured to perform operations including:

calculating the respective recommendation score for the particular recommended visualization by applying the wide scoring model to a first combination of the sparse meta-feature vector with the sparse configuration attribute set and the deep scoring model to a second combination of at least one dense meta-feature vector from the set of multiple dense meta-feature vectors with the dense configuration attribute set.

7. A non-transitory computer-readable medium embodying program code for generating a scoring function to identify a recommended visualization for a dataset, the program code comprising instructions which, when executed by a processor, cause the processor to perform operations comprising:

calculating multiple meta-features of a training dataset, each meta-feature describing a relationship between multiple data attributes of the training dataset;

modifying a meta-feature space that describes the meta-features of the training dataset, wherein the modified meta-feature space includes first vector data describing the meta-features;

generating a set of multiple dense meta-feature vectors that includes, for each particular data attribute combination in a set of combinations of the multiple data attributes, a respective dense meta-feature vector that includes respective meta-features describing at least one data attribute of the particular data attribute combination;

generating a sparse meta-feature vector identifying a frequency of occurrences of the respective meta-features within the set of multiple dense meta-feature vectors;

accessing a configuration space that describes a set of visualization configurations, wherein the configuration space includes second vector data describing, for each visualization configuration in the set of visualization configurations, respective configuration attributes describing characteristics of a dataset visualization;

generating (i) a dense configuration attribute set identifying the respective configuration attributes of the each visualization configuration in the set of visualization configurations and (ii) a sparse configuration attribute set identifying a frequency of the respective configuration attributes in the dense configuration attribute set;

modifying a visualization space to include third vector data describing relationships of the meta-features described by the meta-feature space with the respective configuration attributes of the set of visualization configurations described by the configuration space;

calculating a wide scoring function configured to generate a wide score, the wide score based on co-occurrence of values in the sparse meta-feature vector and additional values in the sparse configuration attribute set;

calculating a deep scoring function configured to generate a deep score, the deep score based on interaction of values in the dense meta-feature vector and additional values in the dense configuration attribute set; and training a visualization scoring model that is configured to apply the wide scoring function and the deep scoring function to generate a recommendation score, wherein training the visualization scoring model i) is based on the visualization space and ii) includes modifying a parameter included in one or more of the wide scoring function or the deep scoring function.

8. The non-transitory computer-readable medium of claim 7, wherein the each meta-feature is a respective vector within the meta-feature space, and wherein the relationship between the multiple data attributes of the training dataset is described based on a position of the each meta-feature with respect to an additional position of an additional meta-feature within the meta-feature space.

9. The non-transitory computer-readable medium of claim 7, the program code further comprising instructions which cause the processor to perform:
    calculating a meta-feature learning function that is configured to map one or more data attributes of the multiple data attributes of the training dataset to the meta-feature space,
    wherein calculating the multiple meta-features is by applying the meta-feature learning function to each data attribute of the training dataset.

10. The non-transitory computer-readable medium of claim 7, the program code further comprising instructions which cause the processor to perform:
    normalizing the meta-features included in the set of multiple dense meta-feature vectors; and
    identifying a set of bins in which each of the normalized meta-features is included,
    wherein generating the sparse meta-feature vector is based on the identified set of bins of the normalized meta-features.

11. The non-transitory computer-readable medium of claim 7, the program code further comprising instructions which cause the processor to perform:
    identifying a cluster of the meta-features included in the set of multiple dense meta-feature vectors,
    wherein generating the sparse meta-feature vector is based on the identified cluster of the meta-features.

12. The non-transitory computer-readable medium of claim 7, the program code further comprising instructions which cause the processor to perform:
    identifying a one-hot encoded feature of a configuration attribute included in the dense configuration attribute set,
    wherein generating the sparse configuration attribute set is based on the identified one-hot encoded feature.

13. The non-transitory computer-readable medium of claim 7, wherein the wide scoring function includes a vector of wide parameters that describes the wide scoring function.

14. The non-transitory computer-readable medium of claim 7, wherein the deep scoring function includes a vector of deep parameters that describes the deep scoring function.

15. The non-transitory computer-readable medium of claim 7, the program code further comprising instructions which cause the processor to perform:
    comparing the recommendation score to a ground-truth label associated with a training visualization that includes (i) at least one visualization configuration in the set of visualization configurations and (ii) a combination of a subset of the multiple data attributes of the training dataset,
    wherein modifying the parameter is based on the comparison of the recommendation score to the ground-truth label.

16. The non-transitory computer-readable medium of claim 15, wherein the training visualization includes one or more of: a positive visualization or a negative visualization.

17. A method of generating a recommended visualization of a dataset, the method comprising:
    generating, from data attributes of an input dataset, a set of data attribute combinations;
    modifying a meta-feature space that describes training meta-features of training datasets, wherein the modified meta-feature space includes first vector data describing i) meta-features extracted from data attributes of the input dataset and ii) the training meta-features;
    generating i) a set of multiple dense meta-feature vectors that includes, for each particular data attribute combination in the set of data attribute combinations, a respective dense meta-feature vector that includes respective meta-features describing the particular data attribute combination from the set of data attribute combinations, and ii) a sparse meta-feature vector identifying a frequency of occurrences of the meta-features within the set of multiple dense meta-feature vectors;
    accessing a configuration space that describes a set of visualization configurations, wherein the configuration space includes second vector data describing, for each visualization configuration in the set of visualization configurations, respective configuration attributes describing characteristics of a dataset visualization;
    generating a dense configuration attribute set generated from the respective configuration attributes of the each visualization configuration in the set of visualization configurations, and a sparse configuration attribute identifying a frequency of the respective configuration attributes in the dense configuration attribute set;
    accessing a trained visualization scoring model that includes a wide model and a deep model, wherein the trained visualization scoring model is trained based on a visualization space that includes third vector data describing relationships of the training meta-features described by the meta-feature space with the respective configuration attributes of the visualization configurations described by the configuration space;
    calculating, via the wide model included in the trained visualization scoring model, a wide score for a visualization by determining co-occurrence of a particular feature-pair associated with a particular meta-feature in the sparse meta-feature vector and a particular visualization configuration in the sparse configuration attribute set;
    calculating, via the deep model included in the trained visualization scoring model, a deep score for the visualization by determining multiple additional feature-pairs associated with an additional particular meta-feature in the set of multiple dense meta-feature vectors and the particular visualization configuration in the dense configuration attribute set;
    generating a recommendation score for the visualization based on a combination of the wide score and the deep score;
    selecting the visualization based on the recommendation score;
    generating visualization image data based on the selected visualization; and
    providing the visualization image data to an additional computing system.

18. The method of claim 17, further comprising:
    mapping the meta-features of the set of multiple dense meta-feature vectors to the meta-feature space.

19. The method of claim 17, further comprising:
calculating a meta-feature learning function that is configured to map meta-features of the set of multiple dense meta-feature vectors to the meta-feature space,
wherein generating the set of multiple dense meta-feature vectors and the sparse meta-feature vector includes identifying the meta-features by applying the meta-feature learning function to the input dataset.

20. The method of claim 17, further comprising:
mapping the respective configuration attributes to the configuration space.

* * * * *